United States Patent
Yang et al.

(10) Patent No.: US 9,042,327 B2
(45) Date of Patent: May 26, 2015

(54) METHOD FOR TRANSMITTING CONTROL INFORMATION AND A DEVICE THEREFOR

(75) Inventors: Suckchel Yang, Anyang-si (KR); Mingyu Kim, Anyang-si (KR); Seunghee Han, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 185 days.

(21) Appl. No.: 13/884,566

(22) PCT Filed: Nov. 18, 2011

(86) PCT No.: PCT/KR2011/008835
§ 371 (c)(1),
(2), (4) Date: May 9, 2013

(87) PCT Pub. No.: WO2012/067459
PCT Pub. Date: May 24, 2012

(65) Prior Publication Data
US 2013/0242923 A1    Sep. 19, 2013

Related U.S. Application Data

(60) Provisional application No. 61/415,304, filed on Nov. 18, 2010, provisional application No. 61/434,404, filed on Jan. 19, 2011, provisional application No. 61/435,170, filed on Jan. 21, 2011.

(51) Int. Cl.
*H04Q 9/00* (2006.01)
*H04W 72/04* (2009.01)
(Continued)

(52) U.S. Cl.
CPC ......... *H04W 72/0406* (2013.01); *H04L 1/1825* (2013.01); *H04L 1/1893* (2013.01);
(Continued)

(58) Field of Classification Search
CPC ..... H04L 1/1825; H04L 1/1893; H04L 5/001; H04L 5/0053; H04L 1/1861; H04L 1/1607; H04L 5/0055; H04W 72/0406
USPC .......................................... 370/329; 455/450
See application file for complete search history.

(56) References Cited

U.S. PATENT DOCUMENTS

2010/0265870 A1* 10/2010 Cai et al. ........................ 370/312
2010/0271970 A1* 10/2010 Pan et al. ....................... 370/252
(Continued)

FOREIGN PATENT DOCUMENTS

CN    101789851    7/2010

OTHER PUBLICATIONS

Qualcomm Incorporated, "PUCHH resources for multi-bit ACK," 3GPP TSG RAN WG1 #62bis, R1-105557, Oct. 2010, 3 pages.
(Continued)

*Primary Examiner* — Wanda Z Russell
(74) *Attorney, Agent, or Firm* — Lee, Hong, Degerman, Kang & Waimey

(57) ABSTRACT

The present invention relates to a wireless communication system. More specifically, the present invention relates to a method for transmitting uplink control information and to a device therefor, and relates to a method comprising the steps of: selecting one uplink control channel resource corresponding to a plurality of HARQ-ACKs, from a plurality of uplink control channel resources; and transmitting a bit value corresponding to the plurality of HARQ-ACKs, by using the selected uplink control channel resource. The present invention also relates to a device for the method.

16 Claims, 9 Drawing Sheets

(51) Int. Cl.
  *H04L 1/18* (2006.01)
  *H04L 5/00* (2006.01)
  *H04L 1/16* (2006.01)

(52) U.S. Cl.
  CPC ............ *H04L 5/001* (2013.01); *H04L 5/0053* (2013.01); *H04L 5/0055* (2013.01); *H04L 1/1607* (2013.01); *H04L 1/1861* (2013.01); *H04L 5/0007* (2013.01); *H04L 5/008* (2013.01); *H04L 5/0094* (2013.01)

(56) References Cited

U.S. PATENT DOCUMENTS

2011/0249578 A1*  10/2011  Nayeb Nazar et al. ....... 370/252
2013/0178221 A1*  7/2013  Jung et al. .................... 455/450

OTHER PUBLICATIONS

Nokia Siemens Networks, et al., "Mapping table and other remaining details for Format 1b with Channel Selection," 3GPP TSG RAN WG1 Meeting #62bis, R1-105520, Oct. 2010, 6 pages.

Samsung, "UL HARQ-ACK Multiplexing: Mapping for 4 Bits," 3GPP TSG RAN WG1 #62, R1-104577, Aug. 2010, 3 pages.

Samsung, "HARQ-ACK Resource Indication in PUCHH for DL CA," 3GPP TSG RAN WG1 #62bis, R1-105359, Oct. 2010.

PCT International Application No. PCT/KR2011/008835, Written Opinion of the International Searching Authority dated Jun. 22, 2012, 16 pages.

The State Intellectual Property Office of the People's Republic of China Application Serial No. 201180055737.8, Office Action dated Mar. 31, 2015, 6 pages.

* cited by examiner

METHOD FOR TRANSMITTING CONTROL INFORMATION AND A DEVICE THEREFOR

CROSS-REFERENCE TO RELATED APPLICATIONS

This application is the National Stage filing under 35 U.S.C. 371 of International Application No. PCT/KR2011/008835, filed on Nov. 18, 2011, which claims the benefit of U.S. Provisional Application Ser. No. 61/415,304, filed on Nov. 18, 2010, U.S. Provisional Application Ser. No. 61/434,404, filed on Jan. 19, 2011, and U.S. Provisional Application Ser. No. 61/435,170, filed on Jan. 21, 2011, the contents of which are all hereby incorporated by reference herein in their entirety.

TECHNICAL FIELD

The present invention relates to a wireless communication system, and more particularly, to a method for transmitting control information and a device for the same.

BACKGROUND ART

Wireless communication systems have been widely deployed to provide various types of communication services including voice and data services. In general, a wireless communication system, is a multiple access system, that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for transmitting uplink control information and a device for the same in a wireless communication system. Another object of the present invention is to provide a method for efficiently transmitting control information, preferably, ACK/NACK information in a multicarrier situation and a device for the same.

It will be appreciated by persons skilled in the art that the objects that could be achieved with the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for transmitting uplink control information when a plurality of serving cells including a primary cell and a secondary cell are configured in a wireless communication system, the method including: receiving information indicating some of PUCCH (Physical Uplink Control Channel) formal 1b resources of a first set configured by a higher layer through an SPS (Semi-Persistent Scheduling) activation PDCCH (Physical Downlink Control Channel); receiving an SPS PDSCH (Physical Downlink Shared Channel) without a corresponding PDCCH in the primary cell after receiving the SPS PDCCH; generating a plurality of HARQ-ACKs (Hybrid Automatic Repeat request-Acknowledgements) including reception response information corresponding to a transport block of the SPS PDSCH; selecting a PDCCH format 1b resource corresponding to the plurality of HARQ-ACKs from PUCCH format 1b resources of a second set including one or more PUCCH format 1b resources obtained on the basis of the indication information; and transmitting a bit value corresponding to the plurality of HARQ-ACKs using the selected PUCCH format 1b resource, wherein one PUCCH format 1b resource is provided on the basis of the indication information when the primary cell is set to a transmission mode supporting a transmission of only a single transport block and a plurality of PUCCH format 1b resources is provided on the basis of the indication information when the primary cell is set to a transmission mode supporting transmission of a plurality of transport blocks.

In another aspect of the present invention, provided herein is a communication device configured to transmit uplink control information when a plurality of serving cells including a primary cell and a secondary cell are configured in a wireless communication system, the communication device including: an RF (Radio Frequency) unit; and a processor, wherein the processor is configured to receive information indicating some of PUCCH format 1b resources of a first set configured by a higher layer through an SPS activation PDCCH, to receive an SPS PDSCH without a corresponding PDCCH in the primary cell after receiving the SPS PDCCH, to generate a plurality of HARQ-ACKs including reception response information corresponding to a transport block of the SPS PDSCH, to select a PDCCH format 1b resource corresponding to the plurality of HARQ-ACKs from PUCCH format 1b resources of a second set including one or more PUCCH format 1b resources obtained on the basis of the indication information, and to transmit a bit value corresponding to the plurality of HARQ-ACKs using the selected PUCCH format 1b resource, wherein one PUCCH format 1b resource is provided on the basis of the indication information when the primary cell is set to a transmission mode supporting a transmission of only a single transport block and a plurality of PUCCH format 1b resources is provided on the basis of the indication information when the primary cell is set to a transmission mode supporting transmission of a plurality of transport blocks.

The indication information may indicate a single value, wherein one PUCCH format 1b resource is provided on the basis of the single value when the primary cell is set to a transmission mode supporting a transmission of only a single transport block and a pair of PUCCH format 1b resources is provided on the basis of the single value when the primary cell is set to a transmission mode supporting transmission of a plurality of transport blocks.

The relationship among the plurality of HARQ-ACKs, the PUCCH format 1b resources of the second set and the bit value may include the relationship shown in Table 1

TABLE 1

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |

TABLE 1-continued

| HARQ-ACK(0) | HARQ-ACK(1) | HARQ-ACK(2) | $n_{PUCCH,i}^{(1)}$ | b(0)b(1) |
|---|---|---|---|---|
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | No Transmission | | wherein HARQ-ACK(0) and HARQ-ACK(1) represent ACK/NACK/DTX(Acknowledgement/Negative ACK/Discontinuous Transmission) responses to transport blocks of a serving cell set to a transmission mode supporting transmission of 2 transport blocks, HARQ-ACK(2) represents an ACK/NACK/DTX response to a transport block of a serving cell set to a transmission mode supporting transmission of a single transport block, $n_{PUCCH,i}^{(1)}$ (i=0, 1, 2) denotes the PUCCH format 1b resources of the second set, and b(0)b(1) denotes the bit value, wherein $n_{PUCCH,i}^{(1)}$ (i=2) is provided on the basis of the indication information when the primary cell is set to a transmission mode supporting a transmission of only a single transport block and $n_{PUCCH,i}^{(1)}$ (i=0, 1) is provided on the basis of the indication information when, the primary cell is set to a transmission mode supporting transmission of a plurality of transport blocks.

The relationship among the plurality of HARQ-ACKs, the PUCCH format 1b resources of the second set and the bit value may include the relationship shown in Table 2

TABLE 2

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | No Transmission | |

Wherein HARQ-ACK(0) and HARQ-ACK(1) represent ACK/NACK/DTX responses to transport blocks of the primary cell, HARQ-ACK(2) and HARQ-ACK(3) represent ACK/NACK/DTX responses to transport blocks of the secondary cell, $n_{PUCCH,1}^{(1)}$ (i=0, 1, 2, 3) denotes the PUCCH format 1b resources of the second set, and b(0)b(1) denotes the bit value, wherein $n_{PUCCH,1}^{(1)}$ (i=0, 1) is provided on the basis of the indication information.

$n_{PUCCH,1}^{(1)}$ (i=2, 3) may be provided using a lowest CCE index and tire next CCE index of CCEs constructing a PDCCH corresponding to transport blocks of the secondary cell when the PDCCH corresponding to the transport blocks of the secondary cell is received in the primary cell, and $n_{PUCCH,1}^{(1)}$ (i=2, 3) may be provided using PUCCH format 1b resource indexes of a third set configured by an RRC (Radio Resource Control) layer when the PDCCH corresponding to the transport blocks of the secondary cell is received in the secondary cell.

The indication information may be received through a TPC (Transmit Power Control) field of the SPS activation PDCCH.

Advantageous Effects

According to the present invention, uplink control information can be efficiently transmitted in a wireless communication system. Furthermore, control information, preferably, ACK/NACK information can be efficiently transmitted in a multicarrier situation.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

Figure 1:
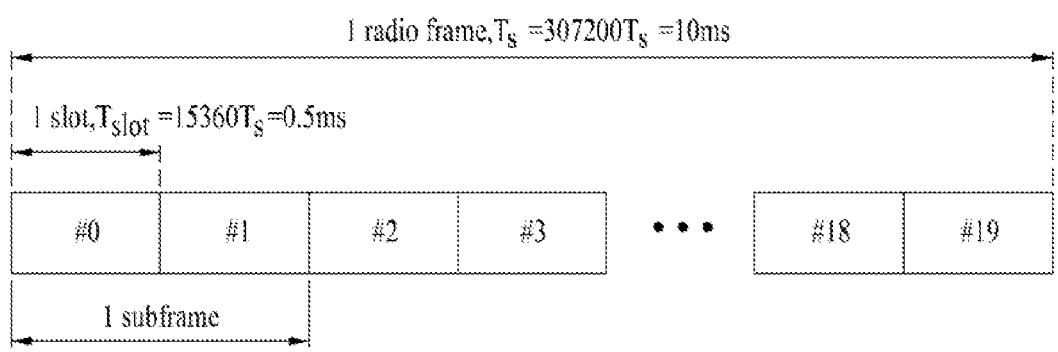
FIG. 1 illustrates a radio frame structure.

FIG. 1 illustrates a radio frame structure.

Referring to FIG. 1, a radio frame includes 10 subframes. A subframe includes two slots in time domain. A time for transmitting one subframe is defined as a transmission lime interval (TTI). For example, one subframe may have a length of 1 millisecond (ms), and one slot may have a length of 0.5 ms. One slot includes a plurality of orthogonal frequency division multiplexing (OFDM) or single carrier frequency division multiple access (SC-FDMA) symbols in time domain. Since LTE uses the OFDMA in the downlink and uses SC-FDMA in the uplink, an OFDM or SC-FDMA symbol represents one symbol period. A resource block (RB) is a resource allocation unit, and includes a plurality of contiguous subcarriers in one slot. The structure of the radio frame is shown for exemplary purposes only. Thus, the number of sub-frames included in the radio frame or the number of slots included in the subframe or the number of OFDM symbols included in the slot may be modified in various manners.

Figure 2:
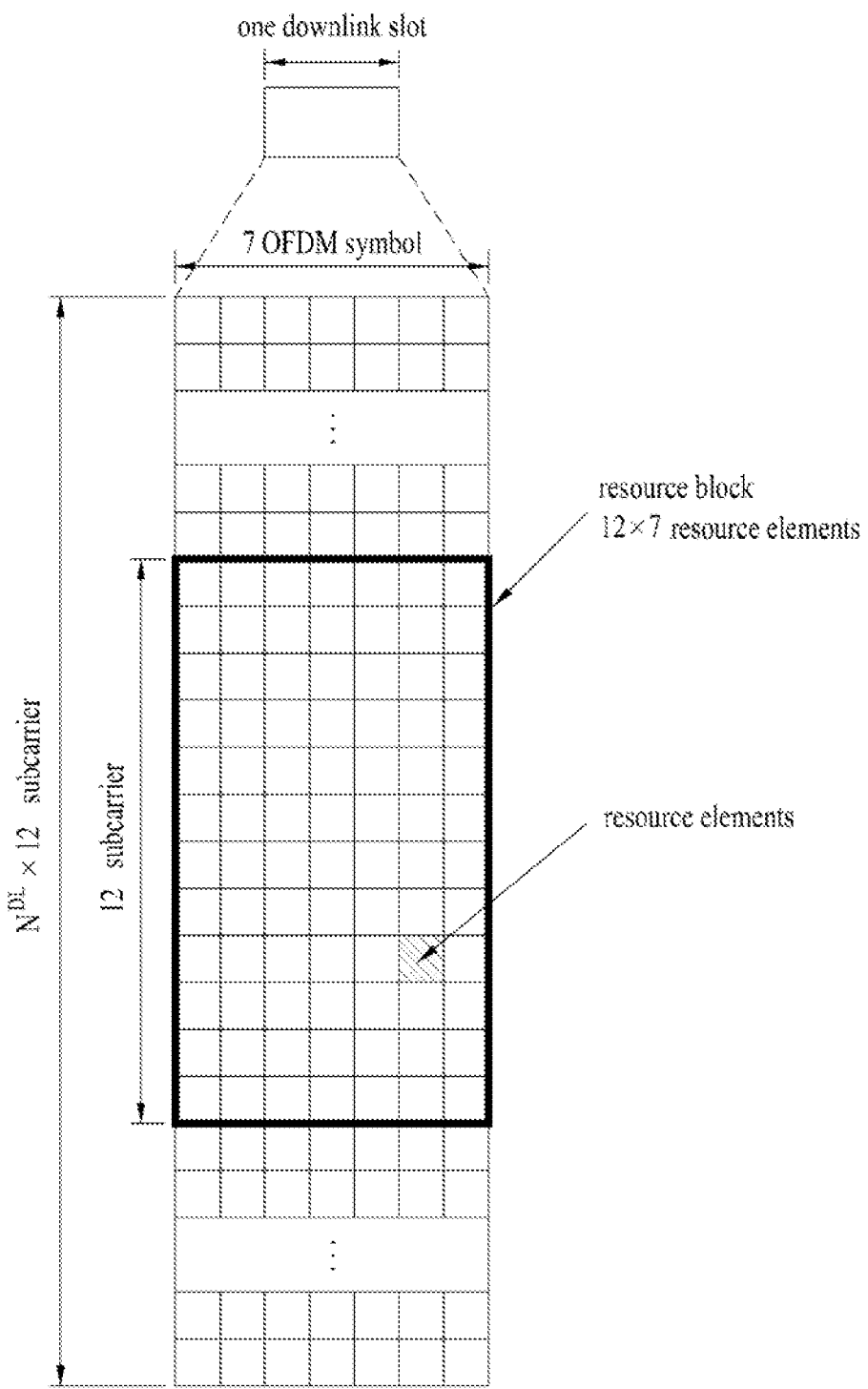
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot, may be same as that of the downlink slot except that OFDM symbols by replaced by SC-FDMA symbols.

Figure 3:
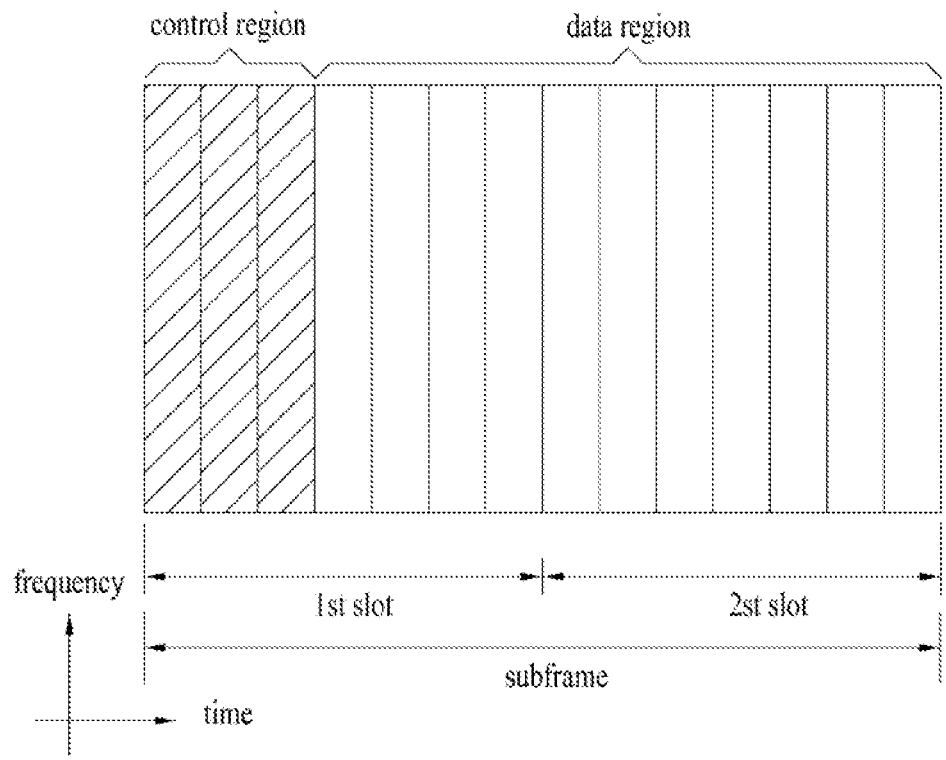
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control, region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping, hi the specifically, the PDSCH, TB and CW are interchangeably used. Examples of downlink control channels used in LTE include a physical control, format indicator channel (PCFICH), a physical downlink control channel (PDCCH), a physical hybrid ARQ Indicator channel (PHICH), etc. The PCFICH is transmitted at a first OFDM symbol of a sub frame and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode

Transmission mode 1: Transmission from a single base station antenna port

Transmission mode 2: Transmit diversity

Transmission mode 3: Open-loop spatial multiplexing

Transmission mode 4: Closed-loop spatial multiplexing

Transmission mode 5; Multi-user MIMO

Transmission mode 6: Closed-loop rank-1 preceding

Transmission mode 7: Transmission using UE-specific reference signals

DCI Format

Format 0: Resource grants for the PUSCH transmissions (uplink)

Format 1: Resource assignments for single codeword PDSCH transmissions (transmission modes 1, 2 and 7)

Format 1A: Compact signaling of resource assignments for single codeword PDSCH (all modes)

Format 1B: Compact resource assignments for PDSCH using rank-1 closed loop preceding (mod 6)

Format 1C: Very compact resource assignments for PDSCH (e.g. paging/broadcast system information)

Format 1D: Compact resource assignments for PDSCH using multi-user MIMO (mode 5)

Format 2; Resource assignments for PDSCH for closed-loop MIMO operation (mode 4)

Format 2A: Resource assignments for PDSCH for open-loop MIMO operation (mode 3)

Format 3/3A: Power control commands for PUCCH and PUSCH with 2-bit/1-bit power adjustments As described above, the PDCCH may carry a transport format and a resource allocation of a downlink shared, channel (DL-SCH), resource allocation information of an uplink shared channel (UL-SCH), paging information on a paging channel (PCH), system information on the DL-SCH, information on resource allocation of an upper-layer control message such as a random, access response transmitted on the PDSCH, a set of Tx power control commands on individual UEs within an arbitrary UE group, a Tx power control command, information on activation of a voice over IP (VoIP), etc. A plurality of PDCCHs can be transmitted, within, a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information, block (SIB)), a system information RNTI (SI-RNTI) may be masked to the CRC. When the PDCCH is for a random access response, a random access-RNTI (RA-RNTI) may be masked to the CRC.

Figure 4:
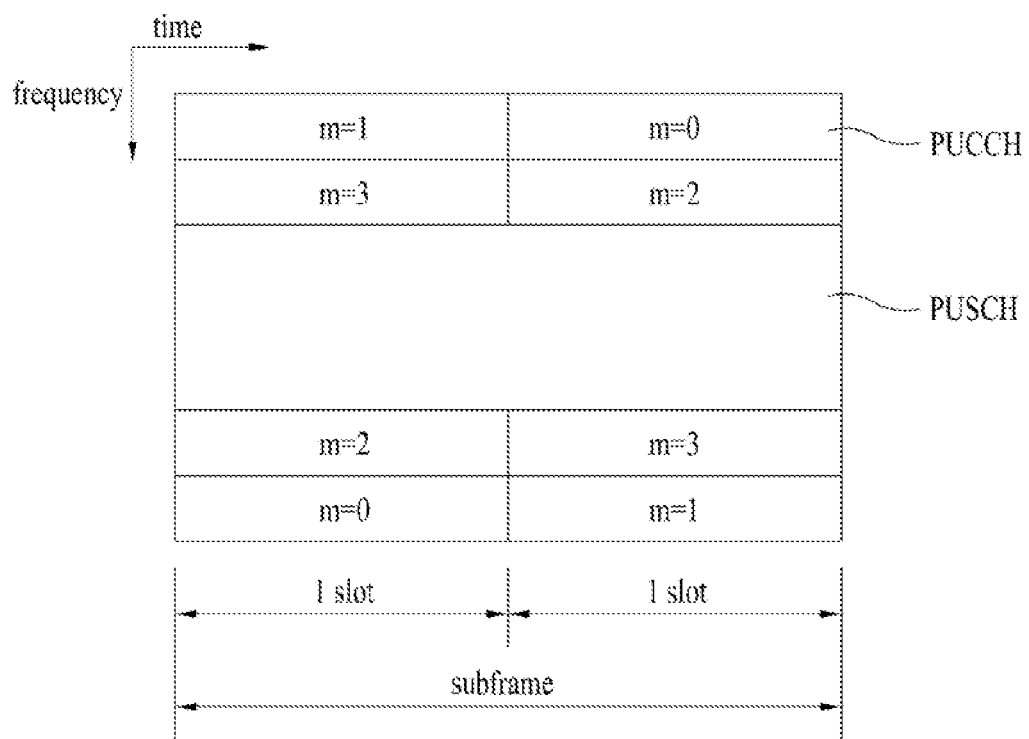
FIG. 4 illustrates an uplink subframe structure.

FIG. 4 illustrates an uplink subframe structure.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK; This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Preceding Matrix Indicator (PMI), 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 1 shows the mapping relationship between PUCCH formats and UCI in LTE.

TABLE 1

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
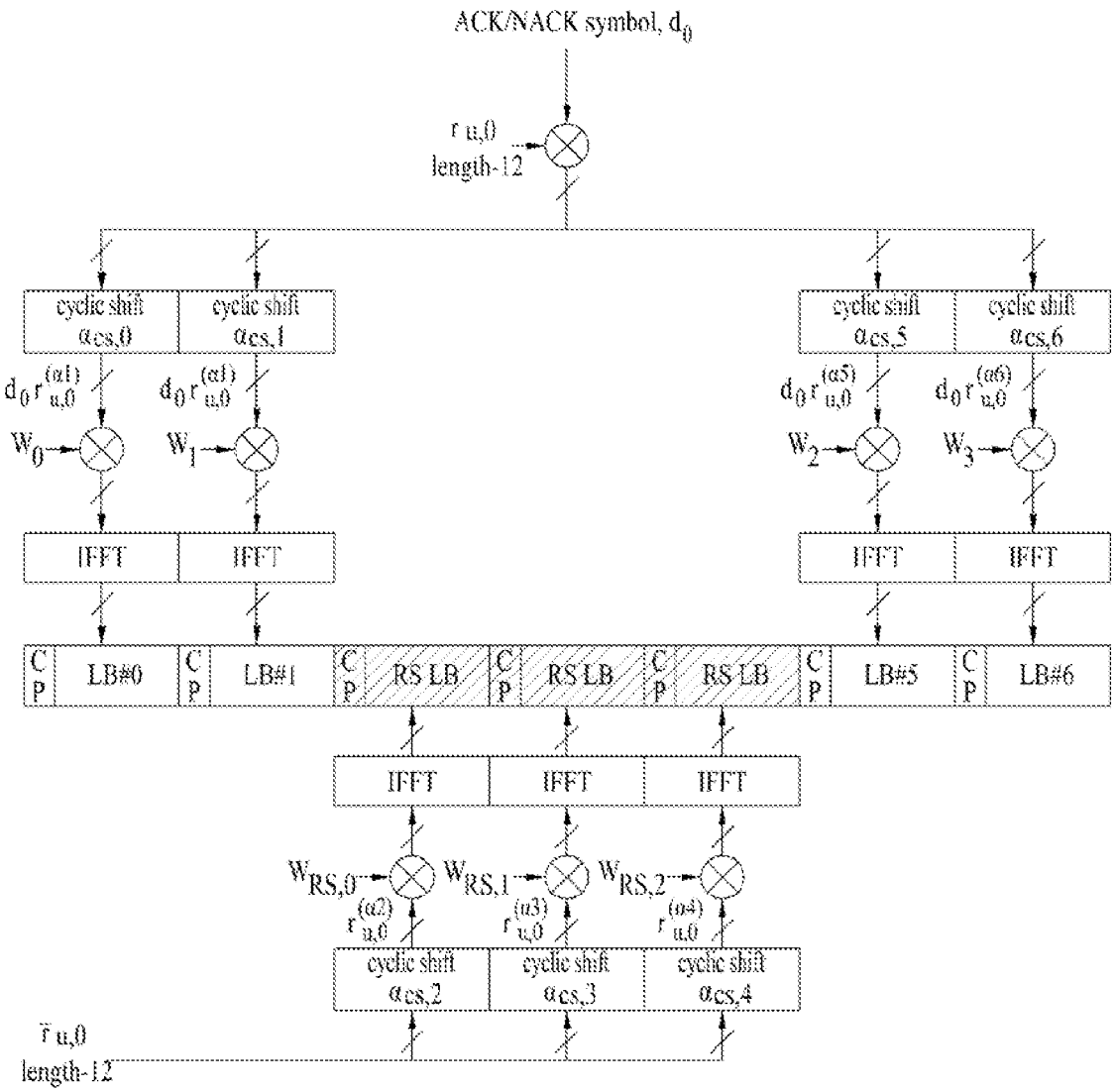
FIG. 5 illustrates a slot level structure of PUCCH format 1a/1b.

FIG. 5 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission. PUCCH format 1a/1b is called PUCCH format 1 for convenience.

Referring to FIG. 5, 1-bit [b(0)] and 2-bit [b(0)b(1)] ACK/NACK information are modulated according to BPSK and QPSK modulation schemes respectively, to generate one ACK/NACK modulation symbol $d_0$. Each bit [b(i), i–0, 1] of the ACK/NACK information indicates a HARQ response to a corresponding DL transport block, corresponds to 1 in the case of positive ACK and corresponds to 0 in case of negative ACK (NACK). Table 2 shows a modulation table defined for PUCCH formats 1a and 1b in LTE.

TABLE 2

| PUCCH format | $b(0), \ldots, b(M_{bit} - 1)$ | d(0) |
| --- | --- | --- |
| 1a | 0 | 1 |
|  | 1 | −1 |
| 1b | 00 | 1 |
|  | 01 | −j |
|  | 10 | j |
|  | 11 | −1 |

PUCCH formats 1a/1b perform time domain spreading using an orthogonal spreading code $W_0, W_1, W_2, W_3$, (e.g. Walsh-Hadamard or DFT code) in addition to cyclic shift $\alpha_{cs,x}$ in the frequency domain. In the case of PUCCH formats 1a/1b, a larger number of UEs can be multiplexed on the same PUCCH RB because code multiplexing is used in both frequency and time domains.

RSs transmitted from different UEs are multiplexed using the same method as is used to multiplex UCI. The number of cyclic shifts supported by SC-FDMA symbols for PUCCH ACK/NACK RB can be configured by cell-specific higher layer signaling parameter $\Delta_{shift}^{PUCCH}$. $\Delta_{shift}^{PUCCH} \in \{1, 2, 3\}$ represents that shift values are 12, 6 and 4, respectively. In time-domain CDM, the number of spreading codes actually used for ACK/NACK can be limited by the number of RS symbols because multiplexing capacity of RS symbols is less than that of UCI symbols due to a smaller number of RS symbols.

Figure 6:
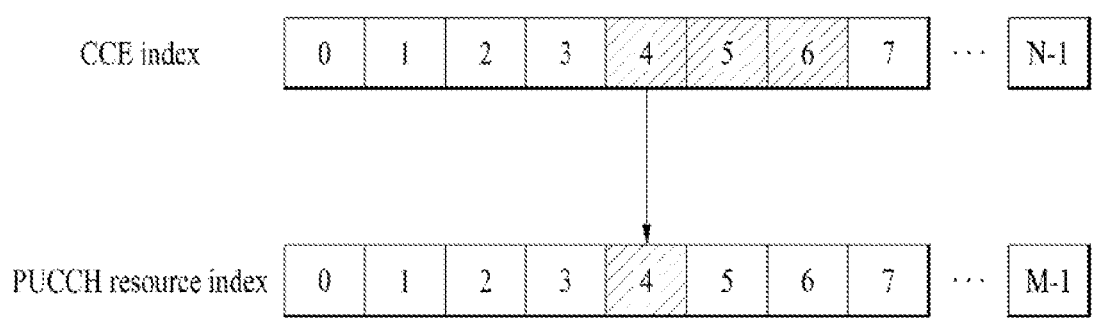
FIG. 6 illustrates an example of determining a dynamic PUCCH resource for ACK/NACK.

FIG. 6 illustrates an example of determining PUCCH resources for ACK/NACK. In LTE, a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered. The region in which the PDCCH is transmitted in a DL subframe is configured with a plurality of Control Channel Elements (CCEs), and the PDCCH transmitted to the UE is composed of one or more CCEs. The UE transmits the ACK/NACK signal through a PUCCH resource corresponding to a specific one (e.g. first CCE) of the CCEs constituting the received PDCCH.

Figure 8:
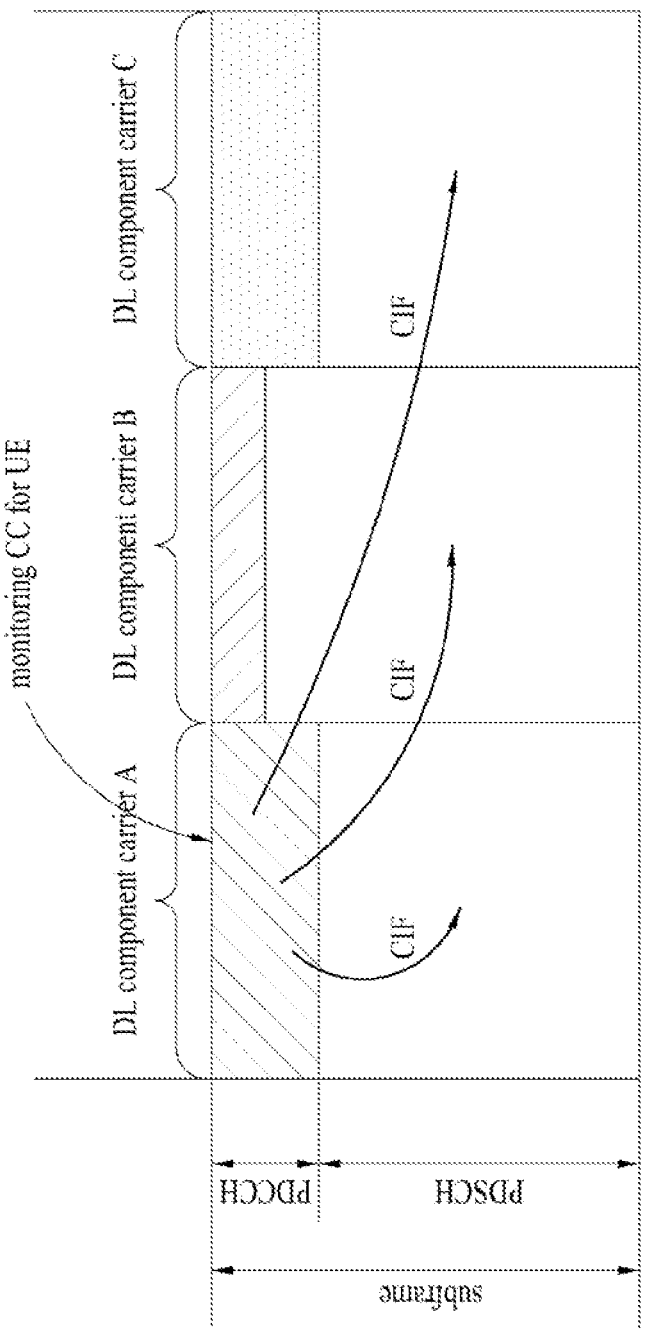
FIG. 8 illustrates scheduling in case of aggregation of a plurality of carriers.

Referring to FIG. 6, each block in a Downlink Component Carrier (DL CC) represents a CCE and each block in an Uplink Component Carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 8, a UE transmits an ACK/NACK signal on PUCCH #4 corresponding to CCE #4, the first CCE of the PDCCH. FIG. 8 illustrates a case in which maximum M PUCCHs are present in the UL CC when maximum N CCEs exist in the DL CC. Though N can equal M, N may differ from M and CCEs are mapped to PUCCHs in an overlapped manner.

Specifically, a PUCCH resource index in LTE is determined as follows.

$$n^{(1)}{}_{PUCCH}=n_{CCE}+N^{(1)}{}_{PUCCH}$$ [Equation 1]

Here, $n^{(1)}{}_{PUCCH}$ represents a resource index of PUCCH format 1 for ACK/NACK/DTX transmission, $N^{(1)}{}_{PUCCH}$ denotes a signaling value received, from a higher layer, and $N_{CCE}$ denotes the smallest value of CCE indexes used for PDCCH transmission. A cyclic shift an orthogonal spreading code and a Physical Resource Block (PRB) for PUCCH formats 1a/1b are obtained from $n^{(1)}{}_{PUCCH}$.

A description will be given of SPS (Semi-Persistent Scheduling) and a method, for semi-statically allocating a PUCCH resource for ACK/NACK during SPS.

Unicast data is dynamically allocated a resource according to scheduling for each subframe. SPS reserves a resource for traffic periodically generated having a middle/low data rate, such as VoIP (Voice over Internet Protocol) or streaming. SPS can reduce scheduling overhead and stably allocate resources by reserving a resource for specific traffic.

In case of DL/UL SPS in LTE, information about a subframe through which SPS transmission (Tx)/reception (Rx) needs to be performed is provided through RRC (Radio Resource Control) signaling and activation, reactivation and release of SPS are performed through a PDCCH. Subframe information for SPS includes a subframe interface and a subframe offset. For convenience, a PDCCH for activation/reactivation/release of SPS is called an SPS PDCCH. The SPS PDCCH carries RB allocation information for SPS Tx/Rx and MCS (Modulation and Coding Scheme) information. The SPS PDCCH has a CRC (Cyclic Redundancy Check) masked with an SPS C-RNTI (Cell Radio Network Temporary Identifier) and NDI is set as NDI=0. Accordingly, a UE does not directly perform SPS Tx/Rx even when allocated information about a subframe for which SPS needs to be performed through RRC signaling. When the UE receives the SPS PDCCH that signals SPS activation (or reactivation), the UE performs SPS Tx (e.g. PUSCH transmission) or SPS Rx (e.g. PDSCH reception) in a subframe allocated through RRC signaling. SPS Tx/Rx is performed in the corresponding subframe using RB allocation information and MCS information included in the SPS PDCCH. Upon reception of a PDCCH that signals SPS release, the UE interrupts SPS Tx/Rx. When an SPS PDCCH that signals activation (or reactivation) is received, the interrupted SPS Tx/Rx is resumed using RB allocation and an MCS indicated by the SPS PDCCH in a subframe allocated through RRC signaling.

In case of SPS activation, DCI fields of the SPS PDCCH are set as shown in Table 3. A field combination shown in FIG. 3 is used as a virtual CRC for SPS activation PDCCH validation.

TABLE 3

|  | DCI format 0 | DCI format 1/1A | DCI format 2/2A/2B |
| --- | --- | --- | --- |
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '0000' TDD: set to '0000' | FDD: set to '0000' TDD: set to '0000' |
| Modulation and coding scheme | N/A | MSB is set to '0' | For the enabled transport block: MSB is set to '0' |

TABLE 3-continued

|  | DCI format 0 | DCI format 1/1A | DCI format 2/2A/2B |
| --- | --- | --- | --- |
| Redundancy version | N/A | set to '00' | For the enabled transport block: set to '00' |

The virtual CRC is used to additionally detect, an error by checking whether a corresponding field value is an appointed value. If a UE does not detect an error although the error is generated in a DCI allocated to the UE and misrecognizes die DCI as SPS activation, the one-time error continuously generate problems because the UE continuously uses the corresponding resource. Accordingly, incorrect detection of SPS is prevented using the virtual CRC.

In case of SRS release, DCI fields of the SPS PDCCH are set as shown in Table 4. A field combination shown in FIG. 4 is used as a virtual CRC for SPS release PDCCH validation. In case of SPS release, the UE transmits ACK/NACK for the SPS release PDCCH.

TABLE 4

|  | DCI format 0 | DCI format 1A |
| --- | --- | --- |
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation an coding scheme | N/A | set to '11111' |
| Redundancy version | N/A | set to '00' |
| Resource block assignment | N/A | Set to all '1's |

A detailed description will be given of uplink SPS. The BS signals a subframe (e.g. an interval of 20 ms) for which SPS needs to be performed to die UE through higher layer (e.g. RRC) signaling. Then, the BS can transmit an SPS PDCCH signaling SPS activation to the UE. The SPS PDCCH includes UL grant information. In this case, the UE is allocated a specific RB and MCS designated by the SPS PDCCH at an interval of 20 ms for uplink transmission after reception of a UL grant message through SPS signaling. Accordingly, the UE can perform uplink transmission using the RB and MCS designated by the SPS PDCCH at an interval of 20 ms. There is no PDCCH corresponding to a PUSCH signal transmitted during SPS. For convenience, a PUSCH according to SPS is called an SPS PUSCH. Downlink SPS is performed similarly. Specifically, upon reception of an SPS activation PDCCH having a DL grant, the UE can receive a downlink signal (e.g. PDSCH) using an RB and MCS designated fay the SPS PDCCH at an interval of 20 ms. There is no PDCCH corresponding to a PDSCH signal transmitted during SPS. For convenience, a PDSCH according to SPS is called an SPS PDSCH. In case of the SPS PDSCH, a PDCCH corresponding thereto is not present. In this sense, the SPS PDSCH can be referred to as a PDSCH without a PDCCH. Accordingly, it is impossible to allocate a PUCCH resource for ACK/NACK transmission using CCEs constructing a PDCCH, as described above with reference to FIG. 6 and Equation 1. To solve this, LTE configures a PUCCH resource candidate set for ACK/NACK transmission for the SPS PDSCH through higher layer signaling and explicitly indicates one PUCCH resource included in the PUCCH resource candidate set through, the SPS activation PDCCH. A value indicating the PUCCH resource can be transmitted through a TPC (Transmit Power Control) field of the SPS activation PDCCH.

Table 5 shows PUCCH resource indexes for downlink SPS defined in LTE. Referring to Table 5, 4 PUCCH resource indexes are configured by a higher layer and one PUCCH resource index can be indicated through the TPC field (TPC command) of the SPS activation PDCCH.

TABLE 5

| Value of 'TPC command for PUCCH' | $n^{(1)}_{PUCCH}$ |
| --- | --- |
| 00 | First PUCCH resource index configured by a higher layer |
| 01 | Second PUCCH resource index configured by a higher layer |
| 10 | Third PUCCH resource index configured by a higher layer |
| 11 | Fourth PUCCH resource index configured by a higher layer |

A description will be given of an ACK/NACK channel selection scheme (simply, A/N channel selection scheme or channel selection scheme). When an LTE system operates in TDD, the UE transmits one multiplexed ACK/NACK signal for a plurality of PDSCHs received through different subframes. Specifically, the UE transmits one multiplexed ACK/NACK signal for a plurality of PDSCHs using the A/N channel selection scheme. A/N channel selection is also called a PUCCH selection transmission scheme. In the A/N channel selection scheme, the UE occupies a plurality of uplink physical channels in order to transmit a multiplexed ACK/NACK signal upon receiving a plurality of downlink data. For example, when the UE receives a plurality of PDSCHs, the UE can occupy as many PUCCH resources as the number of the PDSCHs using a specific CCE indicating each PDSCH. In this case, the UE can transmit a multiplexed ACK/NACK signal using a combination of information about a PUCCH resource selected from the occupied PUCCH resources and information about modulation/coding applied to the selected PUCCH resource.

Table 6 shows an A/N channel selection scheme defined in LTE.

TABLE 6

| HARQ-ACK(0), HARQ-ACK(1), HARQ-ACK(2), HARQ-ACK(3) | Subframe | |
| --- | --- | --- |
| | $n^{(1)}_{PUCCH,i}$ | b(0), b(1) |
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,1}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,2}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 6, HARQ-ACK(i) indicates the HARQ ACK/NACK/DTX result of an i-th data unit ($0 \leq i \leq 3$). The HARQ ACK/NACK/DTX result includes ACK, NACK, DTX and NACK/DTX. NACK/DTX represents NACK or DTX, ACK and NACK represent whether a TB (equivalent to a CW) transmitted through a PDSCH has been successfully decoded or not. DTX (Discontinuous Transmission) represents that a PDCCH has not been successfully detected. Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 3, $n^{(1)}_{PUCCH,X}$ represents a PUCCH resource actually used for ACK/NACK transmission, and b(0)b(1) indicates two bits transmitted through the selected PUCCH resource, which are modulated using QPSK. For example, when the UE has decoded 4 data units successfully, the UE transmits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except in some cases (NACK/DTX, N/D).

Figure 7:
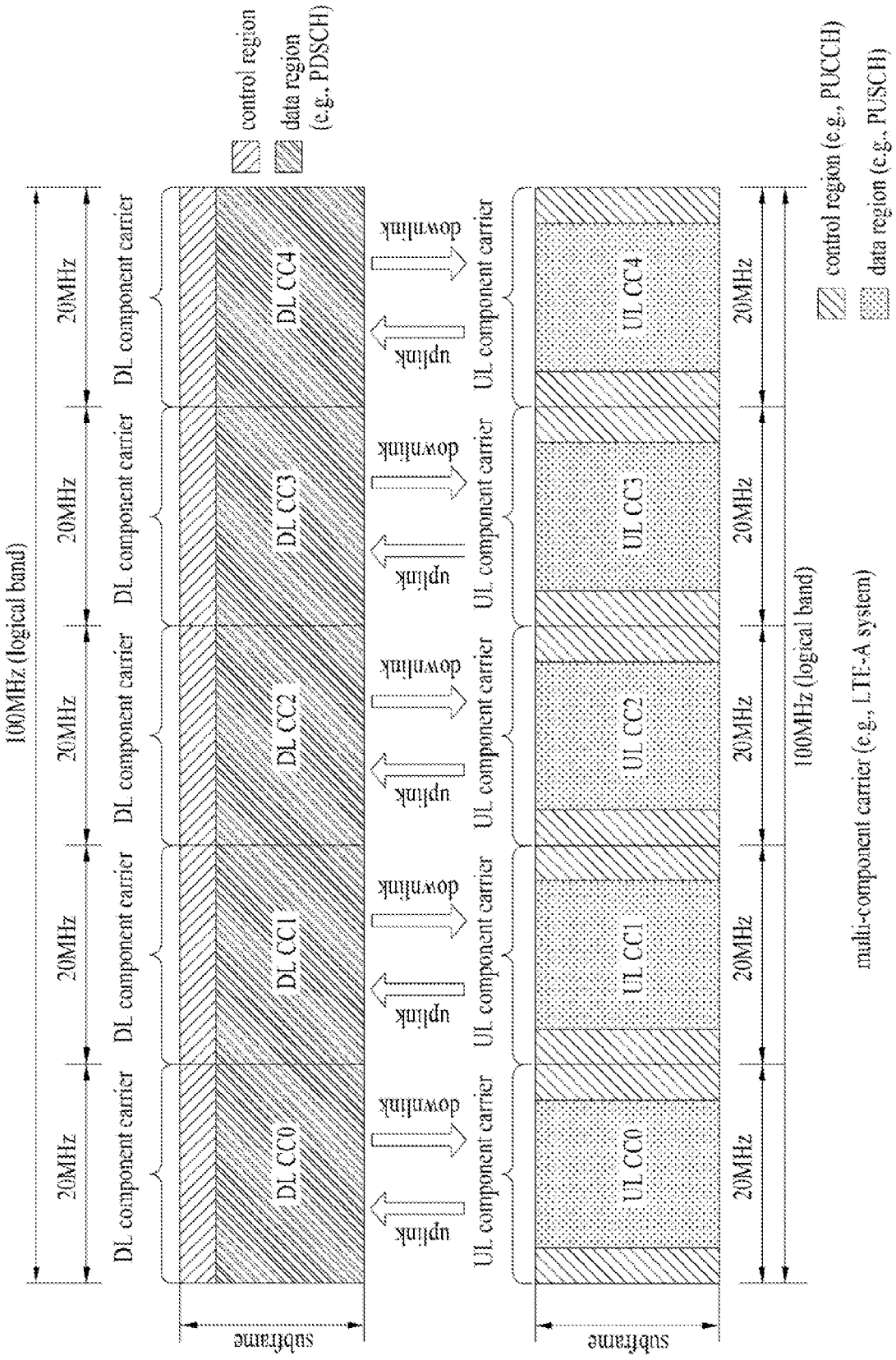
FIG. 7 illustrates a carrier aggregation (CA) communication system.

FIG. 7 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 7, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system, bandwidth, is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly; a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

FIG. 8 illustrates scheduling when a plurality of carriers is aggregated, it is assumed that 3 DL CCs are aggregated and DL CC A is set to a PDCCH CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a OF (non-cross-CC scheduling). When the OF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs (cross-CC scheduling). In this case, DL CC B and DL CC C that are not set to PDCCH CCs do not deliver PDCCHs. Accordingly, the DL CC A (PDCCH CC) needs to include ail of a PDCCH search space relating to the DL CC A, a PDCCH search space relating to the DL CC B and a PDCCH search space relating to the DL CC C.

LTE-A considers transmission of a plurality of ACK/NACK information/signals with respect to a plurality of PDSCHs, which are transmitted through a plurality of DL CCs, through a specific UL CC (e.g. UL PCC or UL PCell). For description, it is assumed that a UE operates in a SU-MIMO (Single User-Multiple Input Multiple Output) mode in a certain DL CC to receive 2 codewords (or transport blocks). In this case, the UE needs to be able to transmit 4 feedback slates, ACK/ACK, ACK/NACK, NACK/ACK and NACK/NACK, or up to 5 feedback states including even DTX for the DL CC. If the DL CC is set to support a single codeword (or transport block), up to 3 states of ACK, NACK and DTX are present for the DL CC. Accordingly, if NACK and DTX are processed as the same state, a total of 2 feedback states of ACK and NACK/DTX are present for the DL CC. Accordingly, if the UE aggregates a maximum of 5 DL CCs and operates in the SU-MIMO mode in all CCs, the UE can have up to 55 transmittable feedback states and an ACK/NACK payload size for representing the feedback states corresponds to 12 bits. If DTX and NACK are processed as the same state, the number of feedback states is 45 and an ACK/NACK payload size for representing the same is 10 bits.

LTE-A, preferably, FDD LTE-A discusses transmission of a plurality of ACK/NACK information/signals using PUCCH format 1a/1b and ACK/NACK multiplexing (i.e. A/N channel selection) where were used in a conventional LTE TDD system in a multicarrier situation. The conventional LTE TDD system uses an implicit ACK/NACK selection scheme of using a PUCCH resource corresponding to each PDCCH that schedules each PDSCH (i.e. linked to a lowest CCE index) as an ACK/NACK multiplexing (i.e. ACK/NACK selection) method to secure PUCCH resources. However, when the implicit ACK/NACK selection scheme is applied using PUCCH resources in different RBs, performance deterioration may occur. Accordingly, LTE-A discusses an explicit ACK/NACK selection scheme that reserves PUCCH resources through RRC signaling, preferably, a plurality of PUCCH resources in the same RB or neighboring RBs, for a UE.

Table 7 shows an example of explicitly indicating a PUCCH resource for HARQ-ACK. Specifically, a PUCCH resource set can be configured by a higher layer (e.g. RRC) and a PUCCH resource to be actually used can be indicated using an ARI (ACK/NACK Resource Indicator) value of a PDCCH. The ARI value can be indicated using a TPC (Transmit Power Control) field corresponding to a PDSCH on an SCell. The ARI value can also be indicated in different manners. The ARI value is used interchangeably with a HARQ-ACK resource indication value.

TABLE 7

| HARQ-ACK resource value (ARI) for PUCCH | $n_{PUCCH}$ |
|---|---|
| 00 | First PUCCH resource index configured by a higher layer |
| 01 | Second PUCCH resource index configured by a higher layer |
| 10 | Third PUCCH resource index configured by a higher layer |
| 11 | Fourth PUCCH resource index configured by a higher layer |

A/N Channel Selection During Dynamic Scheduling

A description will be given of a method of applying an A/N channel selection scheme when multiple carriers are configured in an LTE-A system, preferably, FDD LTE-A system. The following description assumes dynamic scheduling. That is, it is assumed that ACK/NACK information is transmission on UL when a DL grant PDCCH and a PDSCH corresponding thereto are received. A mapping table for A/N channel selection can be designed under the following conditions in LTE-A.

(1) Full implicit PUCCH resource indication is supported. An implicit PUCCH resource means a PUCCH resource linked to a specific CCE (e.g. first CCE) from among one or more CCEs constructing the DL grant PDCCH (refer to Equation 1).

(2) LTE fallback is supported. LTE fallback is a scheme in which a PUCCH format used for ACK/NACK state transmission and a modulation symbol transmitted through the PUCCH format conform to those defined in LTE when all serving cells (i.e. SCells) other than a PCell correspond to NACK/DTX. Mapping of ACK/NACK states and modulation symbols is determined based on ACK/NACK regarding the PCell.

(3) Performances of individual ACK/NACK bits are equalized by improving worst ACK/NACK bit performance and average performance.

Table 8 shows the relationship between a TB of a serving cell and HARQ-ACK in 2-, 3- and 4-bit A/N channel selection schemes.

TABLE 8

| | HARQ-ACK(j) | | | |
|---|---|---|---|---|
| | HARQ-ACK(0) | HARQ-ACK(1) | HARQ-ACK(2) | HARQ-ACK(3) |
| 2-bit | TB1 PCell | TB1 SCell | NA | NA |
| 3-bit | TB1 Serving cell#1 | TB2 Serving cell#1 | TB1 Serving cell#2 | NA |

TABLE 8-continued

| | HARQ-ACK(j) | | | |
|---|---|---|---|---|
| | HARQ-ACK(0) | HARQ-ACK(1) | HARQ-ACK(2) | HARQ-ACK(3) |
| 4-bit | TB1 PCell | TB1 SCell#1 | TB1 SCell#2 | NA |
| | TB1 PCell | TB2 PCell | TB1 SCell | TB2 SCell |
| | TB1 PCell | TB1 SCell#1 | TB1 SCell#2 | TB2 SCell#2 |
| | TB1 PCell | TB1 SCell#1 | TB1 SCell#2 | TB1 SCell#3 |

Table 9 shows a mapping table for 2-bit A/N channel selection. 2-bit A/N channel selection is based on the assumption that 2 serving cells are aggregated. Accordingly, 2-bit A/N channel selection corresponds to a case in which one non-SDM (Spatial Division Multiplexing) cell and one non-SDM are aggregated. A non-SDM cell means a cell set to a transmission mode supporting only transmission, of a maximum of one TB. An SDM cell means a cell set to a transmission mode supporting transmission, of a maximum of m (e.g. m=2) TBs. The non-SDM cell and the SDM cell are used, interchangeably with a non-MIMO cell and a MIMO cell.

TABLE 9

| | | PUCCH resource | |
|---|---|---|---|
| PCell | SCell | 0 | 1 |
| ACK | ACK | | −1 |
| ACK | NACK/DTX | −1 | |
| NACK/DTX | ACK | | 1 |
| NACK | NACK/DTX | 1 | |
| DTX | NACK/DTX | No transmission | |

PUCCH resource 0 can be implicitly signaled. For example, PUCCH resource 0 can be linked to a CCE (e.g. lowest CCE index) constructing a DL grant PDCCH corresponding to a PDSCH of a PCell (refer to Equation 1). PUCCH resource 1 can be linked to a CCE (e.g. lowest CCE index) constructing a DL grant PDCCH corresponding to a PDSCH of an SCell (e.g. in case of cross-CC scheduling) or explicitly signaled by RRC (e.g. in case of non-cross-CC scheduling).

Table 10 arranges the mapping table shown in Table 9 in a different form.

TABLE 10

| HARQ-ACK(0) | HARQ-ACK(1) | $n_{PUCCH,i}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No Transmission | |

In Table 10, $n_{PUCCH,i}^{(1)}$ (i=0, 1) denotes PUCCH resource indexes corresponding to PUCCH resources 0 and 1 of Table 9 and b(0)b(1) denotes a bit value corresponding to a complex modulation value of Table 9 (refer to QPSK of Table 2).

Referring to Table 10, upon reception of one or more PDSCHs from the BS, die UE generates HARQ-ACK(0) and HARQ-ACK(1) corresponding to die PDSCHs. The UE selects PUCCH resources (e.g. $n_{PUCCH,1}^{(1)}$) corresponding to HARQ-ACK(0) and HARQ-ACK(1) and transmits a corresponding bit value (or modulation value) to the BS through the selected PUCCH resources.

Table 11 shows a mapping table for 3-bit A/N channel selection. 3-bit A/N channel selection corresponds to a case in which 2 serving cells or 3 serving cells are aggregated. A case in which 2 serving cells are aggregated corresponds to a case in which, one SDM cell and one non-SDM cell are aggregated. In this case, cells and TBs corresponding to HARQ-ACK(0), HARQ-ACK(1) and HARQ-ACK(2) depend on SDM configuration. Specifically, in case of SDM PCell+non-SDM SCell HARQ-ACK(0), HARQ-ACK(1) and HARQ-ACK(2) respectively correspond to PCell TB1, PCell TB2 and SCell TB1. In case of non-SDM PCell+SDM SCell, HARQ-ACK(0), HARQ-ACK(1) and HARQ-ACK(2) respectively correspond to SCell TB1, SCell TB2 and PCell TB1. That is, HARQ-ACK(0), HARQ-ACK(1) and HARQ-ACK(2) respectively correspond to SDM cell TB1, SDM cell TB2 and non-SDM cell TB1.

TABLE 11

| SDM Cell | | non-SDM Cell | | | |
|---|---|---|---|---|---|
| PCell | SCell#1 | SCell#2 | | PUCCH resource | |
| HARQ-ACK(0) | HARQ-ACK(1) | HARQ-ACK(2) | 0 | 1 | 2 |
| ACK, ACK | ACK | | | −1 | |
| ACK, NACK/DTX | ACK | | | j | |
| NACK/DTX, ACK | ACK | | | −j | |
| NACK/DTX, NACK/DTX | ACK | | | | −1 |
| ACK, ACK | NACK | −1 | | | |
| ACK, NACK/DTX | NACK | j | | | |
| NACK/DTX, ACK | NACK | −j | | | |
| NACK/DTX, NACK/DTX | NACK | | | | 1 |
| ACK, ACK | DTX | −1 | | | |
| ACK, NACK/DTX | DTX | j | | | |
| NACK/DTX, ACK | DTX | −j | | | |
| NACK, NACK | DTX | 1 | | | |
| NACK, DTX | DTX | 1 | | | |
| DTX, NACK | DTX | 1 | | | |
| DTX, DTX | DTX | No transmission | | | |

When the PCell is set to an SDM mode, PUCCH resources 0 and 1 are implicitly signaled. For example, PUCCH resources 0 and 1 can be linked to CCEs (e.g. lowest CCE index and lowest CCE index+1) constructing a DL grant PDCCH corresponding to a PDSCH of the PCell (refer to Equation 1). PUCCH resource 2 can be linked to a CCE (e.g. lowest CCE index) constructing a DL grant PDCCH corresponding to a PDSCH of the SCell (e.g. in case of cross-CC scheduling) or explicitly signaled by RRC (e.g. in case of non-cross-CC scheduling).

When the PCell is set to a non-SDM mode, PUCCH resource 2 can be linked to a CCE (e.g. lowest CCE index) constructing the DL grant PDCCH corresponding to the PDSCH of the PCell, PUCCH resources 0 and 1 can be linked to CCEs (e.g. lowest CCE index and lowest CCE index+1) constructing the DL grant PDCCH corresponding to the PDSCH of the SCell (e.g. in case of cross-CC scheduling) or explicitly signaled by RRC (e.g. in case of non-cross-CC scheduling).

To support LTE PUCCH format 1b (LTE fallback when the PCell is an SDM cell), an ACK/ACK/DTX (A/A/D) state is mapped to −1 of PUCCH resource 0 and a NACK/NACK/DTX (N/N/D) state is mapped to +1 of PUCCH resource 0. Furthermore, to support PUCCH format 1a (LTE fallback when the PCell is a non-SDM cell), a DTX/DTX/ACK (D/D/A) state is mapped to −1 of PUCCH resource 2 and a DTX/DTX/NACK (D/B/K) state is mapped to +1 of PUCCH resource 2.

Table 12 arranges the mapping table shown in Table 11 in a different form.

TABLE 12

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK | DTX | $n_{PUCCH,0}^{(1)}$ | 0, 0 |
| NACK | DTX | DTX | $n_{PUCCH,0}^{(1)}$ | 0, 0 |
| DTX | NACK | DTX | $n_{PUCCH,0}^{(1)}$ | 0, 0 |
| DTX | DTX | DTX | No Transmission | |

In Table 12, $n_{PUCCH,i}^{(1)}$ (i=0, 1, 2) denotes PUCCH resource indexes corresponding to PUCCH resources 0, 1 and 2 of Table 11 and b(0)b(1) denotes a bit value corresponding to a complex modulation value of Table 11 (refer to QPSK of Table 2).

Referring to Table 12, upon reception of one or more PDSCHs from the BS, the UE generates HARQ-ACK(0), HARQ-ACK(1) and HARQ-ACK(2) corresponding to the PDSCHs. The UE selects PUCCH resources (e.g. $n_{PUCCH,1}^{(1)}$) corresponding to HARQ-ACK(0), HARQ-ACK(1) and HARQ-ACK(2) and transmits a corresponding bit value (or modulation value) to the BS through the selected PUCCH resources.

Table 13 shows a mapping table for 4-bit A/N channel selection. 4-bit A/N channel selection corresponds to a case in which 2, 3 or 4 serving cells are aggregated. For example, when 2 SDM cells are aggregated, HARQ-ACK(0), HARQ-ACK(1), HARQ-ACK(2) and HARQ-ACK(3) respectively correspond to PCell TB1, PCell TB2, SCell TB1 and SCell TB2.

TABLE 13

| PCell | | SCell | | | | | |
|---|---|---|---|---|---|---|---|
| PCell | | SCell#1 | SCell#2 | | | | |
| PCell HARQ-ACK(0) | SCell#1 HARQ-ACK(1) | SCell#2 HARQ-ACK(2) | SCell#3 HARQ-ACK(3) | 0 | 1 | 2 | 3 |
| ACK, ACK | | ACK, ACK | | −1 | | | |
| ACK, NACK/DTX | | ACK, ACK | | | −j | | |
| NACK/DTX, ACK | | ACK, ACK | | −j | | | |
| NACK/DTX, NACK/DTX | | ACK, ACK | | | | | −1 |
| ACK, ACK | | ACK, NACK/DTX | | j | | | |
| ACK, NACK/DTX | | ACK, NACK/DTX | | | | 1 | |
| NACK/DTX, ACK | | ACK, NACK/DTX | | | | 1 | |
| NACK/DTX, NACK/DTX | | ACK, NACK/DTX | | | | | j |
| ACK, ACK | | NACK/DTX, ACK | | | −1 | | |
| ACK, NACK/DTX | | NACK/DTX, ACK | | | j | | |
| NACK/DTX, ACK | | NACK/DTX, ACK | | | | | −j |
| NACK/DTX, NACK/DTX | | NACK/DTX, ACK | | | | | 1 |
| ACK, ACK | | NACK/DTX, NACK/DTX | | −1 | | | |
| ACK, NACK/DTX | | NACK/DTX, NACK/DTX | | j | | | |
| NACK/DTX, ACK | | NACK/DTX, NACK/DTX | | −j | | | |
| NACK, DTX | | NACK/DTX, NACK/DTX | | 1 | | | |
| DTX, NACK | | NACK/DTX, NACK/DTX | | 1 | | | |
| NACK, NACK | | NACK/DTX, NACK/DTX | | 1 | | | |
| DTX, DTX | | NACK/DTX, NACK/DTX | | No transmission | | | |

In case of SDM PCell+SDM SCell PUCCH resources 0 and 1 can be implicitly signaled. For example, PUCCH resources 0 and 1 can be linked to CCEs (e.g. lowest CCE index and lowest CCE index+1) constructing a DL grant PDCCH corresponding to a PDSCH of the PCell (refer to Equation 1). PUCCH resources 2 and 3 can be linked to CCEs (e.g. lowest CCE index and lowest CCE index+1) constructing a DL grant PDCCH corresponding to a PDSCH of the SCell (e.g. in case of cross-CC scheduling) or explicitly signaled by RRC (e.g. in case of non-cross-CC scheduling).

To support LTE PUCCH format 1b (LTE fallback), an ACK/ACK/DTX/DTX (A/A/D/DTX) state is mapped to −1 of PUCCH resource 0 and a NACK/NACK/DTX/DTX (N/N/D/D) state is mapped to +1 of PUCCH resource 0.

Table 14 arranges the mapping table shown in Table 13 in a different form.

TABLE 14

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK | DTX | NACK/DTX | NACK/DTX | $n_{PUCCH,0}^{(1)}$ | 0, 0 |
| DTX | NACK | NACK/DTX | NACK/DTX | $n_{PUCCH,0}^{(1)}$ | 0, 0 |
| NACK | NACK | NACK/DTX | NACK/DTX | $n_{PUCCH,0}^{(1)}$ | 0, 0 |
| DTX | DTX | NACK/DTX | NACK/DTX | No Transmission | |

In Table 14, $n_{PUCCH,i}^{(1)}$ (i=0, 1, 2, 3) denotes PUCCH resource indexes corresponding to PUCCH resources 0, 1, 2 and 3 of Table 13 and b(0)b(1) denotes a bit value corresponding to a complex modulation value of Table 13 (refer to QPSK of Table 2). $n_{PUCCH,i}^{(1)}$ (i=0, 1, 2, 3) may depend on serving cell configuration. For example, when the PCell is set to a transmission mode supporting transmission of a single TB, $n_{PUCCH,0}^{(1)}$ can be linked to a first CCE index of a CCE constructing a PDCCH corresponding to a PDSCH of the PCell (refer to Equation 1). In this case, $n_{PUCCH,i}^{(1)}$ (i=0, 1, 2, 3) can be linked to the first CCE index (and the second CCE index) relating to a PDCCH corresponding to a PDSCH of an SCell corresponding to HARQ-ACK(1), HARQ-ACK(2) and HARQ-ACK(3) (e.g. in case of cross-CC scheduling) or explicitly provided by a higher layer (e.g. in case of non-cross-CC scheduling). When the PCell is set to a transmission mode supporting transmission of up to 2 TBs, $n_{PUCCH,0}^{(1)}$ and $n_{PUCCH,1}^{(1)}$ and can be linked to the first CCE index and the second CCE index of CCEs constructing the PDCCH corresponding to the PDSCH of the PCell. In this case, $n_{PUCCH,2}^{(1)}$ and $n_{PUCCH,3}^{(1)}$ can be linked to the first CCE index (and the second CCE index) relating to a PDCCH corresponding to a PDSCH of an SCell corresponding to HARQ-ACK(2) and HARQ-ACK(3) (e.g. in case of cross-CC scheduling) or explicitly provided by a higher layer (e.g. in case of non-cross-CC scheduling).

Referring to Table 14, upon reception of one or more PDSCHs from the BS, the UE generates HARQ-ACK(0), HARQ-ACK(1), HARQ-ACK(2) and HARQ-ACK(3) corresponding to the PDSCHs. The UE select PUCCH resources (e.g. $n_{PUCCH,1}^{(3)}$) corresponding to HARQ-ACK(0), HARQ-ACK(1), HARQ-ACK(2) and HARQ-ACK(3) and transmits a corresponding bit value (or modulation value) to the BS through the selected PUCCH resources.

A/N Channel Selection During SPS

An ACK/NACK (A/N) channel selection scheme during dynamic scheduling assumes that 2 dynamic A/N PUCCH resources can be derived from one PDCCH when a PDCCH is received in a cell set to a MIMO mode (i.e. SDM mode). Accordingly, it is possible to feed back ACK/NACK using 3-bit channel selection mapping when the PCell is set to a MIMO mode (i.e. transmission mode supporting transmission of up to m (m≥2) TBs) and the SCell is set to a non-MIMO mode (i.e. transmission mode supporting transmission of a maximum of one TB) even if 2 DL CCs are aggregated (refer to Tables 11 and 12).

When SPS is activated, however, the UE cannot use the above-described assumption (i.e. 2 dynamic A/N PUCCH resources are derived from one PDCCH when a PDCCH is received in a cell set to a MIMO mode) because the UE can receive a PDSCH without a PDCCH in the PCell of a specific subframe (e.g. SPS subframe). The conventional method configures a PUCCH resource for SPS ACK/NACK transmission through a higher layer signaling and allocates only one resource as an actually used. PUCCH resource through the SPS activation PDCCH, as described above with reference to Table 5. The SPS release PDCCH is generally configured using one CCE, and thus only one dynamic A/N PUCCH resource can be derived when the SPS release PDCCH is received. Accordingly, the conventional method can use only one PUCCH resource for SPS ACK/NACK irrespective of whether a cell corresponds to MIMO or non-MIMO. However, the mapping Cables for A/N channel selection, shown in Tables 11 to 14, are designed on the assumption that 2 PUCCH resources can be derived in case of a MIMO cell. Accordingly, when an SPS subframe is present in a MIMO cell, ACK/NACK feedback for the SPS subframe generates a problem relating to PUCCH resource 1 ($n_{PUCCH,1}^{(1)}$) of Tables 11 to 14, for example. That is, when downlink SPS is performed in a serving cell set to MIMO, PUCCH resource allocation for A/N channel selection becomes a problem.

The present invention proposes various schemes for performing A/N channel selection when downlink SPS is performed in a serving cell set to MIMO. For convenience, a PDSCH received according to dynamic scheduling is called a dynamic PDSCH or a normal PDSCH in order to discriminate the dynamic PDSCH from the SPS PDSCH. While a PDCCH corresponding to the dynamic PDSCH exists, a PDCCH corresponding to the SPS PDSCH does not exist. CRC of the PDCCH corresponding to the dynamic PDSCH can be masked with a C-RNTI.

In the following description, the SPS PDSCH may be restricted such that it is transmitted only through a PCell. Furthermore, the SPS PDSCH may be restricted such that it transmits a maximum of one TB irrespective of whether the PCell is set to MIMO/non-MIMO.

Scheme 1

Scheme 1 performs (N−1) bit A/N channel selection for ACK/NACK feedback for a subframe in which the SPS PDSCH is received when the UE is set to perform N bit (e.g. N=3 or 4) A/N channel selection and the SPS PDSCH is received through a serving cell set to the MIMO mode. Since both the BS and the UE know the subframe (i.e. SPS subframe) for the SPS PDSCH, the BS and the UE do not misrecognize a mapping table for channel selection and an error due to the misrecognition is not generated even when, the number of ACK/NACK bits used for A/N channel selection is dynamically changed in the subframe in which the SPS PDSCH is received. In this case, a PUCCH resource reserved for SPS ACK/NACK can be mapped to a resource for the PCell in an (N−1) bit mapping table. For example, when a mapping table for A/N channel selection is changed from a 4-bit table (e.g. Tables 13 and 14) to a 3-bit table (e.g. Tables 11 and 12), the PUCCH resource reserved for SPS ACK/NACK can be used as PUCCH resource 2 (e.g. $n_{PUCCH,2}^{(1)}$) in Tables 11 and 12.

Specifically, when the PCell is set to the MIMO mode and the SCell is set to the non-MIMO mode, the UE is set such that it performs 3-bit A/N channel selection (refer to Tables 11 and 12). However, when the SPS PDSCH is received in the MIMO cell (i.e. PCell), ACK/NACK feedback for a TB of the subframe (i.e. SPS subframe) in which the SPS PDSCH is present can be performed according to 2-bit A/N channel selection (refer to Tables 9 and 10). For example, 2-bit A/N channel selection is performed using one PUCCH resource reserved for SPS ACK/NACK transmission through a higher layer signaling (e.g. RRC signaling) and one PUCCH resource derived from a PDCCH corresponding to an SCell PDSCH. On the contrary, ACK/NACK feedback for a TB of a subframe (non-SPS subframe) in which the SPS PDSCH is not present is performed according to 3-bit A/N channel selection. For example, 3-bit A/N channel selection can be performed using 2 PUCCH resources derived from a PDCCH corresponding to a PCell PDSCH and one PUCCH resource derived from the PDCCH corresponding to the SCell PDSCH.

Alternatively, when the PCell is set to the MIMO mode and the SCell is set to the MIMO mode, the UE is set such, that it performs 4-bit A/N channel selection (refer to Tables 13 and 14). However, when the SPS PDSCH is received in an MIMO cell, preferably, MIMO PCell, ACK/NACK information regarding a TB of the subframe in which the SPS PDSCH is present is fed back according to 3-bit A/N channel selection (refer to Tables 11 and 12). For example, 3-bit A/N channel selection can be performed, using one PUCCH resource reserved for SPS ACK/NACK transmission through higher layer signaling (e.g. RRC signaling) and 2 PUCCH resources derived from a PDCCH corresponding to an SCell PDSCH. On the contrary, ACK/NACK feedback for a TB of a subframe in which the SPS PDSCH is not present can be performed according to 4-bit A/N channel selection. For example, 4-bit A/N channel selection, can be performed using 2 PUCCH resources derived from a PDCCH corresponding to a PCell PDSCH and 2 PUCCH resources derived from the PDCCH corresponding to the SCell PDSCH.

Figure 9:
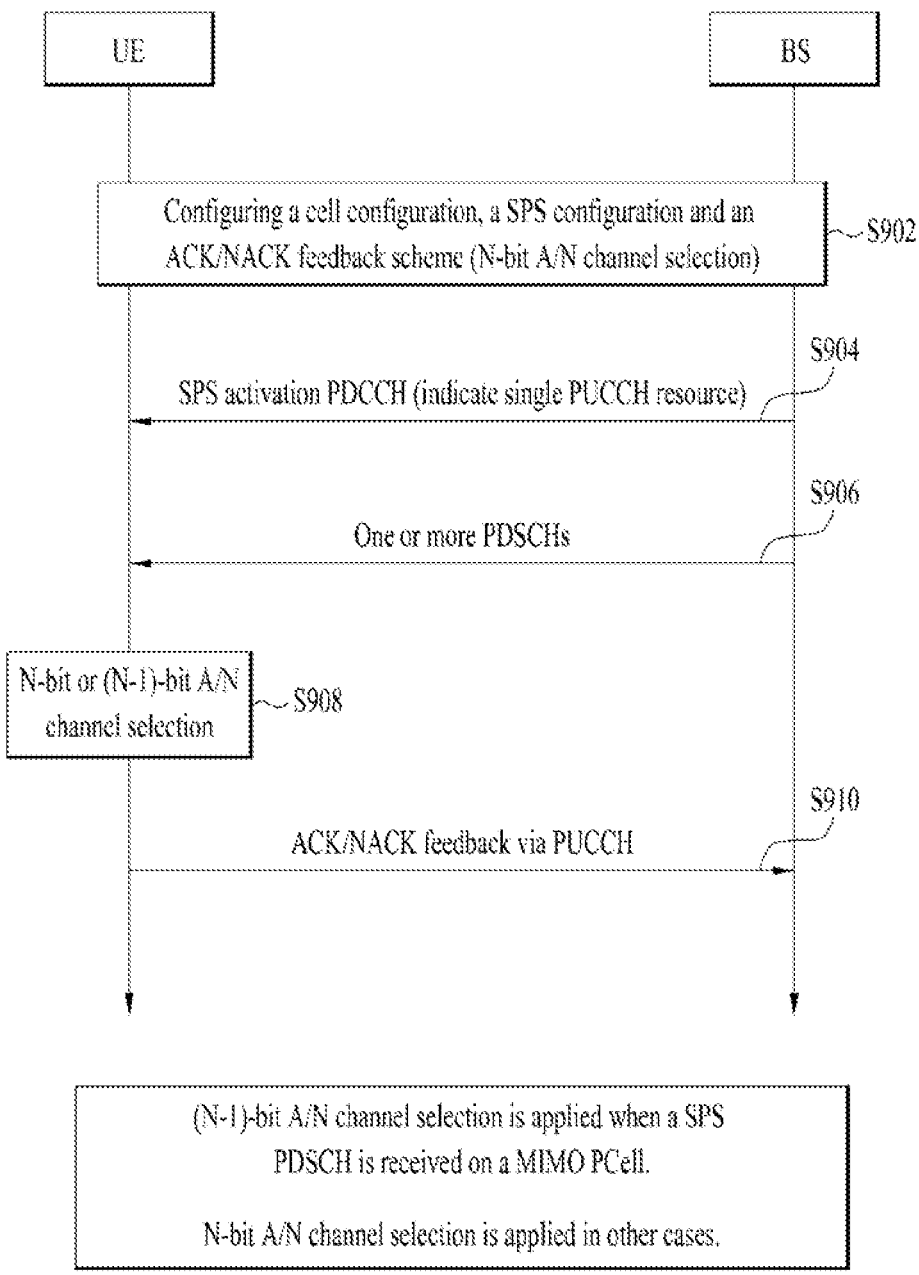
FIGS. 9 and 10 illustrate an ACK/NACK channel selection scheme according to an embodiment of the present Invention.

FIG. 9 illustrates an ACK/NACK feedback process according to an embodiment of the present invention.

Referring to FIG. 9, the BS and the UE can set cell configuration, SPS configuration and an ACK/NACK feedback scheme (S902). Information regarding cell configuration includes the number of aggregated cells and a transmission mode of each cell, for example. Information regarding SPS configuration may include information (e.g. a subframe interval and a subframe offset) indicating the subframe (i.e. SPS subframe) in which the SPS PDSCH is transmitted and information indicating a plurality of PUCCH resources for SPS ACK/NACK, for example. The ACK/NACK feedback scheme includes A/N channel selection and may be explicitly signaled from the BS to the UE or indirectly indicated through cell configuration information, etc. The present ACK/NACK feedback process is performed on the assumption that the ACK/NACK feedback scheme is set to N bit A/N channel selection.

The UE receives the SPS activation PDCCH from the BS (S904). The SPS activation PDCCH (Table 3) can indicate one of a plurality of PUCCH resources allocated during an SPS configuration process. Then, the UE receives one or more PDSCHs from the BS (S906). The one or more PDSCHs can be received through one or more of a plurality of serving cells. The one or more PDSCHs can include at least one of the SPS PDSCH and one or more dynamic PDSCHs.

When one or more PDSCHs are received, the UE performs A/N channel selection for ACK/NACK feedback (S908). In the present embodiment, the UE performs N-bit A/N channel selection or (N−1)-bit A/N channel selection. Specifically, when the SPS PDSCH is received in a MIMO PCell the UE can perform (N−1)-bit A/N channel selection for ACK/NACK feedback. In other cases (i.e. in case of a non-MIMO PCell, in a case in which the SPS PDSCH is not received in the MIMO PCell, etc.), the UE can perform N-bit A/N channel selection for ACK/NACK feedback. Then, the UE feeds back ACK/NACK information through a PUCCH (S910).

When a PDCCH having a C-RNTI is detected from the SPS subframe, data (e.g. a TB) to be transmitted through the SPS PDSCH can be transmitted through a PDSCH indicated by the PDCCH (i.e. overriding). In this case, the UE can feed, back ACK/NACK through PUCCH resource(s) inferred by the detected PDCCH (i.e. N-bit A/N channel selection). However, when the UE fails to detect the PDCCH, the BS expects feedback of ACK/NACK through the PUCCH resource according to the PDCCH (i.e. N-bit A/N channel selection) and the UE transmits ACK/NACK feedback using an SPS PUCCH resource (i.e. (N−1)-bit A/N channel selection), in this case, the number of bits and PUCCH resources used for A/N channel, selection are changed, and thus ACK/NACK cannot be correctly fed back.

Accordingly, when N-bit A/N channel selection is set, the BS and the UE can apply spatial bundling to ACK/NACK information for the PCell while performing (N−1)-bit A/N channel selection all the time in the SPS subframe (or SPS TTI). Spatial bundling is a scheme of applying a logical-AND operation to TBs of a corresponding serving cell. Accordingly, ACK is fed hack only when all responses to TBs correspond to ACK and NACK is fed back in other cases. Spatial bundling may be performed only when, a PDCCH masked with a C-RNTI is detected from the SPS subframe. According to the present scheme, even if a plurality of (e.g. 2) TBs is received through a dynamic PDSCH in the SPS subframe of the PCell, the UE can perform ACK/NACK feedback for the TBs in the same manner as the UE feeds back ACK/NACK for one TB. Accordingly, ambiguity between the BS and the UE disappears even when an (N−1)-bit table instead of an N-bit table is applied for A/N channel selection.

Scheme 2

Scheme 2 performs A/N channel selection using a plurality of (e.g. 2) resources reserved by SPS when the UE is set such that it transmits ACK/NACK using A/N channel selection and the SPS PDSCH is received in a MIMO cell. According to the present scheme, a PUCCH resource shortage problem is not generated during A/N channel selection even if the SPS PDSCH is received in the MIMO cell. Accordingly, A/N channel selection mapping used for a non-SPS subframe can be used for the SPS subframe without change.

Figure 10:
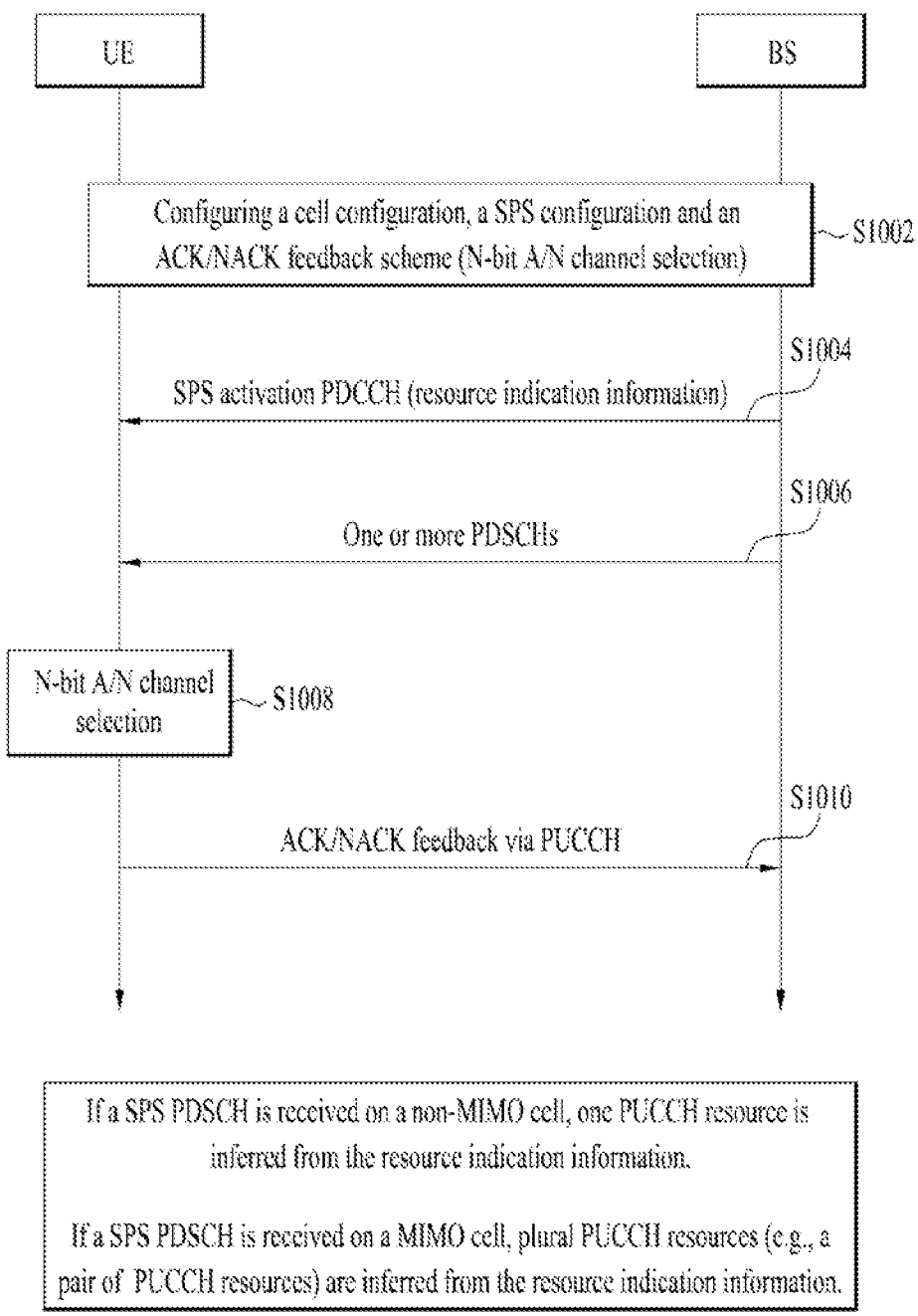

FIG. 10 illustrates an ACK/NACK feedback process according to an embodiment of the present invention.

Referring to FIG. 10, the BS and the UE can set cell configuration, SPS configuration and an ACK/NACK feedback scheme (S1002). Information regarding cell configuration includes the number of aggregated cells and a transmission mode of each cell, for example. Information regarding SPS configuration may include information (e.g. a subframe interval and a subframe offset) indicating the subframe (i.e. SPS subframe) in which the SPS PDSCH is transmitted and information indicating a plurality of PUCCH resources for SPS ACK/NACK, for example. The ACK/NACK feedback scheme includes A/N channel selection and may be explicitly signaled from the BS to the UE or indirectly indicated through cell configuration information, etc. The present ACK/NACK feedback process is performed on the assumption that the ACK/NACK feedback scheme is set to N bit A/N channel selection.

The UE receives the SPS activation PDCCH from the BS (S1004). The SPS activation PDCCH (Table 3) includes resource indication information. Then, the UE receives one or more PDSCHs from the BS (S1006). The one or more PDSCHs can be received through one or more of a plurality of serving cells. The one or more PDSCHs can include at least one of the SPS PDSCH and one or more dynamic PDSCHs.

When one or more PDSCHs are received, the UE performs A/N channel selection to transmit ACK/NACK feedback (S1008). In the present embodiment, the UE performs N-bit A/N channel selection all the time, distinguished from the embodiment shown in FIG. 9. However, one PUCCH resource is derived from the resource indication information of S1004 when the SPS PDSCH is received in a non-MIMO cell and a plurality of (e.g. 2) PUCCH resources are derived from the resource indication information when the SPS PDSCH is received in the MIMO cell. The resource indication information can indicate a single value. The UE feeds back ACK/NACK information through a PUCCH (S1010).

Specifically, the following scheme can be considered as a scheme of using a plurality of (e.g. 2) PUCCH resources for a MIMO cell in which the SPS PDSCH is received when the SPS PDSCH is received in the MIMO cell, preferably MIMO PCell.

The BS can occupy/allocate a total of 4 resource pairs and use one of the 4 PUCCH resource pairs using resource indication information included in an SPS activation PDCCH signal. The resource indication information may be a 2-bit value (i.e. 4 states) transmitted through the TPC field of the SPS activation PDCCH. Detailed schemes are as follows.

Scheme 1: The BS can previously occupy/allocate a total of 8 PUCCH format 1a/1b resources (simply, PUCCH resources). Previous occupation/allocation, of the 8 PUCCH resources can be limited to a case in which the UE is set to the MIMO mode or the PCell is set to the MIMO mode and 4 PUCCH resources can be previously occupied/allocated in other cases. Alternatively, the BS can previously occupy/allocate a total of 8 PUCCH resources and flexibly use the PUCCH resources according to whether a cell (e.g. PCell) in which the SPS PDSCH is transmitted is set to the MIMO mode or non-MIMO mode. Information about the PUCCH resources previously occupied/allocated by the BS can be transmitted from the BS to the UE using a higher layer (e.g. RRC) signal. When the 8 PUCCH resources are signaled, the 8 PUCCH resources can be respectively signaled. If the 8 PUCCH resources have a predetermined relationship (e.g. offset) thereamong, it Is possible to signal some (e.g. 4 PUCCH resources) of the PUCCH resources and infer foe remaining PUCCH resources using the predetermined relationship (e.g. offset). When the BS transmits the SPS activation PDCCH signal to the UE, two of the 8 PUCCH resources can be used through the resource indication, information (e.g. a 2-bit value of the TPC field). For example, if the BS previously occupies/allocates 8 PUCCH resources (e.g. $n_1$, $n_2$, $n_3$, $n_4$, $n_5$, $n_6$, $n_7$, $n_8$), the resource indication information (e.g. 2-bit value) included in the SPS activation PDCCH can be used to indicate a PUCCH resource pair of ($n_1$, $n_5$), ($n_2$, $n_6$), ($n_3$, $n_7$) or ($n_4$, $n_8$). Furthermore, the 8 PUCCH resources allocated by the BS (e.g. RRC layer) may be exclusive or overlapped. Alternatively, 4 PUCCH resource pairs (e.g. ($n_1$, $n_5$), ($n_2$, $n_6$), ($n_3$, $n_7$) and ($n_4$, $n_8$)) can be allocated through a RRC signaling and a PUCCH resource pair to be actually used during SPS can be indicated by the resource indication information (e.g. 2-bit value of the TPC field) of the SPS activation PDCCH.

When the PCell is set to a transmission mode (TM) supporting transmission of a maximum of one TB (e.g. TM 1, 2, 5, 6, 7), one of 4 PUCCH resources configured by the higher layer (e.g., RRC) can be inferred from the resource indication information (e.g. 2-bit value of the TPC field) of die SPS activation PDCCH. The PUCCH resource indicated by the resource indication information (e.g. 2-bit value of the TPC field) can replace a PUCCH resource for the PCell in a mapping table for A/N channel selection.

When the PCell is set to a transmission mode (TM) supporting transmission of up to 2 TBs (e.g. TM 3, 4, 8, 9), one PUCCH resource pair from among 8 PUCCH resources (which may be identical or different) or 4 PUCCH resource pairs configured by the higher layer (e.g. RRC) can be inferred from, the resource indication, information (e.g. 2-bit value of the TPC field) of the SPS activation PDCCH. The PUCCH resource pair inferred by the resource indication information can replace 2 PUCCH resources for the PCell in a mapping table for A/N channel selection.

Scheme 2: The BS can pre-allocate a total of 4 PUCCH format 1a/1b resources (simply, PUCCH resources) to the UE through higher layer (e.g. RRC) signaling. The 4 PUCCH resources allocated by RRC may be exclusive or overlapped. 2 PUCCH resources actually used during SPS can be inferred using the resource indication information (e.g. 2-bit value of the TPC field) of the SPS activation PDCCH signal. For example, if the UE is allocated 4 PUCCH resources (e.g. $n_1$, $n_2$, $n_3$, $n_4$), the resource indication information (e.g. 2-bit value) of the SPS activation PDCCH can indicate a PUCCH resource pair of $(n_1, n_2)$, $(n_2, n_3)$, $(n_3, n_4)$ or $(n_4, n_1)$. Alternatively, the resource indication information (e.g., 2-bit value) of the SPS activation PDCCH can indicate a PUCCH resource pair of $(n_1, n_3)$, $(n_1, n_4)$, $(n_2, n_3)$ or $(n_3, n_4)$. When 4 PUCCH resource pairs each of which is composed of 2 PUCCH resources, such as $(n_1, n_2)$, $(n_2, n_3)$, $(n_3, n_4)$ and $(n_4, n_1)$, are configured by RRC, resources in each PUCCH resource pair can be sequentially mapped to PUCCH resources for the PCell in a mapping table for am channel selection. For example, if $(n_2, n_3)$ is indicated, by the TPC field of the SPS activation PDCCH in ACK/NACK feedback (e.g. Tables 13 and 14) using 4-bit A/N channel selection, resources $n_2$ and $n_3$ can be respectively mapped to PUCCH resources 0 and 1 in the mapping table. The present scheme can be applied only when the UE, preferably, PCell is set to the MIMO mode.

Scheme 3

Scheme 3 uses a PUCCH resource (simply SPS PUCCH) (refer to Table 5 and description thereof) reserved for SPS as the first PUCCH resource (corresponding to PUCCH resource 0 in Tables 11 and 13) of the PCell and uses an explicit PUCCH resource separately allocated through a higher layer (e.g. RRC) signaling as the second PUCCH resource (corresponding to PUCCH resource 1 in Tables 11 and 13) of the PCell in the A/N channel selection scheme when the SPS PDSCH is received in the MIMO PCell. For example, one of a plurality of (e.g. 4) resources allocated through a RRC signaling can be selected as the second PUCCH resource of the PCell in this case, the second PUCCH resource of the PCell can be determined using an ARI (e.g. the value of the TPC field) signaled through a PDCCH that schedules an SCell PDSCH when tire SPS PDSCH is received in the MIMO PCell (refer to Table 7).

When the PCell is set to the MIMO mode and a PDSCH is received in a non-SPS subframe, the first and second PUCCH resources (corresponding to PUCCH resources 0 and 1 in Tables 11 and 13, for example) for the PCell can be linked to CCEs (e.g., lowest CCE index and lowest CCE index +1) constructing a DL grant PDCCH corresponding to a PDSCH of the PCell (that is, implicit PUCCH resource allocation) (refer to Equation 1).

Specifically, when both the PCell and SCell are set to the MIMO mode and 4-bit A/N channel selection is performed (refer to Tables 13 and 14), the following resource allocation scheme can be considered according to whether cross-CC scheduling is enabled or disabled and whether the SPS subframe is present. Resource allocation when the PCell is set to the MIMO mode and the SCell is set to the non-MIMO mode and 3-bit A/N channel selection is performed (refer to Tables 11 and 12) can be applied by excluding the part regarding the second resource of the SCell from the following.

1) When cross-CC scheduling is enabled
  A. In case of non-SPS subframe
    i. PCell 1$^{st}$ resource: implicit PUCCH resource linked to $n_{CCE}$ of a PDCCH that schedules the PCell
    ii. PCell 2$^{nd}$ resource: implicit PUCCH resource linked to $n_{CCE}$+1 of the PDCCH that schedules the PCell
    iii. SCell 1$^{st}$ resource: implicit PUCCH resource linked to $n_{CCE}$ of a PDCCH that schedules the SCell
    iv. SCell 2$^{nd}$ resource: implicit PUCCH resource linked to $N_{CCE}$+1 of the PDCCH that schedules the SCell
  B. In case of SPS subframe
    i. PCell 1$^{st}$ resource: SPS PUCCH resource
    ii. PCell 2$^{nd}$ resource: explicit PUCCH resource
    iii. SCell 1$^{st}$ resource: implicit. PUCCH resource linked to $n_{CCE}$ of the PDCCH that schedules the SCell
    iv. SCell 2$^{nd}$ resource: implicit PUCCH resource linked to $n_{CCE}$+1 of the PDCCH that schedules the SCell
    v. An explicit PUCCH is determined using the TPC field of the PDCCH that schedules the SCell as an ARI. For example, the ARI indicates one of 4 resources pre-allocated through RRC.
2) When cross-CC scheduling is disabled
  A. In case of non-SPS subframe
    i. PCell 1$^{st}$ resource: implicit PUCCH resource linked to $n_{CCE}$ of the PDCCH that schedules the PCell
    ii. PCell 2$^{nd}$ resource: implicit PUCCH resource linked to $n_{CCE}$+1 of the PDCCH that schedules the PCell
    iii. SCell 1$^{st}$ resource: explicit PUCCH resource #1
    iv. SCell 2$^{nd}$ resource: explicit PUCCH resource #2
    v. Explicit PUCCH resources #1 and #2 are determined using the TPC field of the SCell scheduling PDCCH as an ARE For example, the ARI indicates two of 8 resources pre-allocated through RRC.
  B. In case of SPS subframe
    i. PCell 1$^{st}$ resource: SPS PUCCH resource
    ii. PCell 2$^{nd}$ resource: explicit PUCCH resource #3
    iii. SCell 1$^{st}$ resource: explicit PUCCH resource #1
    iv. SCell 2$^{nd}$ resource: explicit PUCCH resource #2
    v. Explicit PUCCH resources #1, #2 and #3 are determined using the TPC field of the SCell scheduling PDCCH as an ART For example, the ARI indicates three of 12 resources pre-allocated through RRC.

Figure 11:
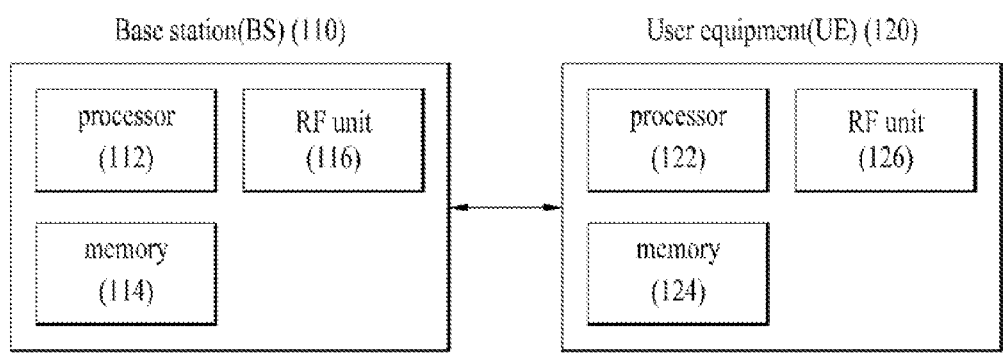
FIG. 11 illustrates a base station (BS) and a user equipment (UE) applicable to an embodiment of the present invention.

FIG. 11 illustrates a BS and a UE applicable to an embodiment of the present invention. When a wireless communication system includes a relay, communication is performed between a BS and the relay on a backhaul link and between the relay and a UE on an access link. The BS or UE shown in FIG. 16 can be replaced by a relay as necessary.

Referring to FIG. 11, an RE communication system includes a BS 110 and a UE 120. The BS 110 includes a processor 112, a memory 114 and an RE unit 116. The processor 112 may be configured to implement the procedures and/or methods proposed, by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without, being combined with other elements or features. Further, an embodiment of the present invention may be constructed by combining pails of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention, or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention, may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form, of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention, may be carried out in other specific ways than those set forth herein without departing from the spirit and essential characteristics of the present invention. The above embodiments are therefore to be construed in all aspects as illustrative and not restrictive. The scope of the invention should, be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

The invention claimed is:

1. A method for transmitting uplink control information by a user equipment (UE) configured with a plurality of serving cells including a primary cell and a secondary cell in a wireless communication system, the method comprising:
receiving, by the UE from a base station (BS), information through an Semi-Persistent Scheduling (SPS) activation Physical Downlink Control Channel (PDCCH), the information indicating at least one Physical Uplink Control Channel (PUCCH) resource of a first set of PUCCH resources having been configured by an RRC (Radio Resource Control) layer and corresponding to a predefined PUCCH format;
after receiving the SPS activation PDCCH, receiving, by the UE from the BS, an SPS Physical Downlink Shared Channel (PDSCH) via the primary cell without receiving a corresponding PDCCH in the primary cell, the SPS PDSCH including only one transport block when the primary cell is set to a first transmission mode supporting a transmission of only a single transport block via the SPS PDSCH, the SPS PDSCH including up to two transport blocks when the primary cell is set to a second transmission mode supporting a transmission of up to two transport blocks via the SPS PDSCH;
generating, by the UE, a Hybrid Automatic Repeat reQuest-Acknowledgement (HARQ-ACK) response corresponding to the SPS PDSCH received via the primary cell;
one of:
selectively transmitting, by the UE to the BS, two bits corresponding to the HARQ-ACK response using one of a second set of PUCCH resources including the resource indicated by the SPS activation PDCCH when the primary cell is set to the first transmission mode, and
selectively transmitting, by the UE to the BS, the two bits corresponding to the HARQ-ACK response using one of a second set of PUCCH resources including the resource indicated by the SPS activation PDCCH and another resource related to the resource indicated by the SPS PDCCH when the primary cell is set to the second transmission mode.

2. The method of claim 1, wherein the predefined PUCCH format is PUCCH format 1b.

3. The method of claim 1,
wherein the information indicating the at least one PUCCH resource indicates a single value, and
wherein a single PUCCH resource, of the first set of PUCCH resources, based on the single value is used to transmit the HARQ-ACK response when the primary cell is set to the first transmission mode, and a pair of PUCCH resources, of the first set of PUCCH resources, based on the single value is used to transmit the HARQ-ACK response when the primary cell is set to the second transmission mode.

4. The method of claim 1, further comprising:
receiving a PDSCH via the secondary cell; and
generating a HARQ-ACK response corresponding to the PDSCH received via the secondary cell,
wherein the transmitted two bits correspond to both the HARQ-ACK response corresponding to the PDSCH received via the secondary cell and the HARQ-ACK response corresponding to the SPS PDSCH received via the primary cell.

5. The method of claim 4, wherein a relationship among the HARQ-ACK response corresponding to the PDSCH received via the secondary cell, the HARQ-ACK response corresponding to the SPS PDSCH received via the primary cell, the second set of PUCCH resources, and the transmitted two bits includes the relationship shown in Table 1:

TABLE 1

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | No Transmission | | wherein HARQ-ACK(0), HARQ-ACK(1) and HARQ-ACK(2) represent the HARQ-ACK response corresponding to the PDSCH received via the secondary cell and the HARQ-ACK response corresponding to the SPS PDSCH received via the primary cell, $n_{PUCCH,i}^{(1)}$ (i=0, 1, 2) denotes the second set of PUCCH resources, and b(0)b(1) denotes the transmitted two bits, wherein, when the primary cell is set to the first transmission mode, $n_{PUCCH,i}^{(1)}$ (i=2) is the resource indicated by the information received via the SPS activation PDCCH, and wherein, when the primary cell is set to the second transmission mode, $n_{PUCCH,i}^{(1)}$ (i=0) is the resource indicated by the information received via the SPS activation PDCCH and $n_{PUCCH,i}^{(1)}$ (i=1) is the another resource.

6. The method of claim 4, wherein a relationship among the HARQ-ACK response corresponding to the PDSCH received via the secondary cell, the HARQ-ACK response corresponding to the SPS PDSCH received via the primary cell, the second set of PUCCH resources, and the transmitted two bits includes the relationship shown in Table 2:

TABLE 2

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | No Transmission | | wherein HARQ-ACK(0), HARQ-ACK(1), HARQ-ACK(2) and HARQ-ACK(3) represent the HARQ-ACK response corresponding to the PDSCH received via the secondary cell and the HARQ-ACK response corresponding to the SPS PDSCH received via the primary cell, $n_{PUCCH,i}^{(1)}$ (i=0, 1, 2, 3) denotes the second set of PUCCH resources, and b(0)b(1) denotes the transmitted two bits, and wherein, when the primary cell is set to the second transmission mode, $n_{PUCCH,i}^{(1)}$ (i=0) is the resource indicated by the information received via the SPS activation PDCCH and $n_{PUCCH,i}^{(1)}$ (i=1) is the another resource.

7. The method of claim 6, wherein $n_{PUCCH,i}^{(1)}$ (i=2, 3) is provided using PUCCH format 1b resource indexes of a third set configured by the RRC layer.

8. The method of claim 1, wherein the information is received through a TPC (Transmit Power Control) field of the SPS activation PDCCH.

9. A user equipment (UE) configured to transmit uplink control information in a wireless communication system, the UE configured with a plurality of serving cells including a primary cell and a secondary cell and comprising:

an RF (Radio Frequency) unit; and
a processor operatively connected to the RF unit and configured to:
receive, from a base station (BS), information through an Semi-Persistent Scheduling (SPS) activation Physical Downlink Control Channel (PDCCH), the information indicating at least one Physical Uplink Control Channel (PUCCH) resource of a first set of PUCCH resources having been configured by an RRC (Radio Resource Control) layer and corresponding to a predefined PUCCH format;
after receiving the SPS activation PDCCH, receive, from the BS, an SPS Physical Downlink Shared Channel (PDSCH) via the primary cell without receiving a corresponding PDCCH in the primary cell, the SPS PDSCH including only one transport block when the primary cell is set to a first transmission mode supporting a transmission of only a single transport block via the SPS PDSCH, the SPS PDSCH including up to two transport blocks when the primary cell is set to a second transmission mode supporting a transmission of up to two transport blocks via the SPS PDSCH;
generate a Hybrid Automatic Repeat reQuest-Acknowledgement (HARQ-ACK) response corresponding to the SPS PDSCH received via the primary cell;
one of:
selectively transmit two bits corresponding to the HARQ-ACK response using one of a second set of PUCCH resources including the resource indicated by the SPS activation PDCCH when the primary cell is set to the first transmission mode, and
selectively transmit the two bits corresponding to the HARQ-ACK response using one of a second set of PUCCH resources including the resource indicated by the SPS activation PDCCH and another resource related to the resource indicated by the SPS activation PDCCH when the primary cell is set to the second transmission mode.

10. The UE of claim 9, wherein the predefined PUCCH format is PUCCH format 1b.

11. The UE of claim 9,
wherein the information indicating the at least one PUCCH resource indicates a single value, and
wherein a single PUCCH resource, of the first set of PUCCH resources, based on the single value is used to transmit the HARQ-ACK response when the primary cell is set to the first transmission mode, and a pair of PUCCH resources, of the first set of PUCCH resources, based on the single value is used to transmit the HARQ-ACK response when the primary cell is set to the second transmission mode.

12. The UE of claim 9, further comprising:
receiving a PDSCH via the secondary cell; and
generating a HARQ-ACK response corresponding to the PDSCH received via the secondary cell,
wherein the transmitted two bits correspond to both the HARQ-ACK response corresponding to the PDSCH received via the secondary cell and the HARQ-ACK response corresponding to the SPS PDSCH received via the primary cell.

13. The UE of claim 12, wherein a relationship among the HARQ-ACK response corresponding to the PDSCH received via the secondary cell, the HARQ-ACK response corresponding to the SPS PDSCH received via the primary cell, the second set of PUCCH resources, and the transmitted two bits includes the relationship shown in Table 1:

TABLE 1

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX |  | No Transmission | wherein HARQ-ACK(0), HARQ-ACK(1) and HARQ-ACK(2) represent the HARQ-ACK response corresponding to the PDSCH received via the secondary cell and the HARQ-ACK response corresponding to the SPS PDSCH received via the primary cell, $n_{PUCCH,i}^{(1)}$ (i=0, 1, 2) denotes the second set of PUCCH resources, and b(0)b(1) denotes the transmitted two bits, wherein, when the primary cell is set to the first transmission mode, $n_{PUCCH,i}^{(1)}$ (i=2) is the resource indicated by the information received via the SPS activation PDCCH, and wherein, when the primary cell is set to the second transmission mode, $n_{PUCCH,i}^{(1)}$ (i=0) is the resource indicated by the information received via the SPS activation PDCCH and $n_{PUCCH,i}^{(1)}$ (i=1) is the another resource.

14. The UE of claim 12, wherein a relationship among the HARQ-ACK response corresponding to the PDSCH received via the secondary cell, the HARQ-ACK response corresponding to the SPS PDSCH received via the primary cell, the second set of PUCCH resources, and the transmitted two bits includes the relationship shown in Table 2:

TABLE 2

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX |  | No Transmission | wherein HARQ-ACK(0), HARQ-ACK(1), HARQ-ACK(2) and HARQ-ACK(3) represent the HARQ-ACK response corresponding to the PDSCH received via the secondary cell and the HARQ-ACK response corresponding to the SPS PDSCH received via the primary cell, $n_{PUCCH,i}^{(1)}$ (i=0, 1, 2, 3) denotes the second set of PUCCH resources, and b(0)b(1) denotes the transmitted two bits, and wherein, when the primary cell is set to the second transmission mode, $n_{PUCCH,i}^{(1)}$ (i=0) is the resource indicated by the information received via the SPS activation PDCCH and $n_{PUCCH,i}^{(1)}$ (i=1) is the another resource.

15. The UE of claim 14,
wherein $n_{PUCCH,i}^{(1)}$ (i=2, 3) is provided using PUCCH format 1b resource indexes of a third set configured by the RRC layer.

16. The UE of claim 9, wherein the information is received through a TPC (Transmit Power Control) field of the SPS activation PDCCH.

* * * * *